United States Patent
Sato et al.

(10) Patent No.: US 7,324,672 B2
(45) Date of Patent: Jan. 29, 2008

(54) INPUT DEVICE, INFORMATION DEVICE, AND CONTROL INFORMATION GENERATION METHOD

(75) Inventors: Daisuke Sato, Chino (JP); Tomio Ikegami, Chino (JP)

(73) Assignee: Seiko Epson Corporation, Tokyo (JP)

( * ) Notice: Subject to any disclaimer, the term of this patent is extended or adjusted under 35 U.S.C. 154(b) by 865 days.

(21) Appl. No.: 10/654,423

(22) Filed: Sep. 4, 2003

(65) Prior Publication Data
US 2004/0107301 A1      Jun. 3, 2004

(30) Foreign Application Priority Data
Sep. 24, 2002   (JP)   ............... 2002-277455

(51) Int. Cl.
*G06K 9/00*    (2006.01)
(52) U.S. Cl. ................................... 382/124
(58) Field of Classification Search ............. 382/124, 382/190, 201, 209, 218, 278
See application file for complete search history.

(56) References Cited

U.S. PATENT DOCUMENTS

| | | | |
|---|---|---|---|
| 5,537,484 A * | 7/1996 | Kobayashi | 382/124 |
| 5,960,101 A * | 9/1999 | Lo et al. | 382/125 |
| 6,175,640 B1 * | 1/2001 | Wada | 382/124 |
| 6,201,886 B1 * | 3/2001 | Nakayama | 382/124 |
| 6,509,847 B1 * | 1/2003 | Anderson | 341/34 |
| 6,757,410 B1 * | 6/2004 | Nakashima | 382/124 |
| 6,898,301 B2 * | 5/2005 | Iwanaga | 382/124 |
| 7,079,670 B2 * | 7/2006 | Pan et al. | 382/124 |
| 2003/0076985 A1 * | 4/2003 | Moghaddam | 382/124 |

FOREIGN PATENT DOCUMENTS

| | | |
|---|---|---|
| EP | 0 973 123 A1 | 1/2000 |
| JP | A 5-40571 | 2/1993 |
| JP | A-2000-48208 | 2/2000 |

OTHER PUBLICATIONS

U.S. Appl. No. 10/653,170, filed Sep. 3, 2003, Mitsutoshi Miyasaka et al.
U.S. Appl. No. 10/654,443, filed Sep. 4, 2003, Daisuke Sato et al.
U.S. Appl. No. 10/665,418, filed Sep. 22, 2003, Daisuke Sato.

* cited by examiner

*Primary Examiner*—Daniel Mariam
(74) *Attorney, Agent, or Firm*—Oliff & Berridge, PLC

(57) ABSTRACT

An input device which generates control information by moving an object to be detected, having an image capture section which captures an image of the object to be detected, a feature point extraction section which extracts a feature point of the image captured by the image capture section, a difference calculation section which calculates a difference between a reference position and a position of the feature point, and a control information output section which outputs the control information corresponding to the calculated difference.

9 Claims, 19 Drawing Sheets

(+) DIRECTION OF Z AXIS

ORIGINAL POINT (−) DIRECTION OF Z AXIS

β (+) DIRECTION

ORIGINAL POINT

β (−) DIRECTION

γ (+) DIRECTION

ORIGINAL POINT

γ (−) DIRECTION

α (+) DIRECTION

ORIGINAL POINT

α (−) DIRECTION (+) DIRECTION OF X AXIS

ORIGINAL POINT (−) DIRECTION OF X AXIS (+) DIRECTION OF Y AXIS

ORIGINAL POINT (−) DIRECTION OF Y AXIS

INPUT DEVICE, INFORMATION DEVICE, AND CONTROL INFORMATION GENERATION METHOD

Japanese Patent Application No. 2002-277455, filed on Sep. 24, 2002, is hereby incorporated by reference in its entirety.

BACKGROUND OF THE INVENTION

The present invention relates to an input device, an information device including the input device, and a control information generation method.

An input device is used as an operating section of an electronic instrument (information instrument or information device). For example, if a user operates the input device, a pointer displayed in a display section is moved or an image of the display section is scrolled in the electronic instrument by using control information (operation information) output from the input device. It is necessary that the input device not decrease operability of the user.

BRIEF SUMMARY OF THE INVENTION

According to a first aspect of the present invention, there is provided an input device which generates control information by moving an object to be detected, comprising:

an image capture section which captures an image of the object to be detected;

a feature point extraction section which extracts a feature point of the image captured by the image capture section;

a difference calculation section which calculates a difference between a reference position and a position of the feature point; and a control information output section which outputs the control information corresponding to the calculated difference.

According to a second aspect of the present invention, there is provided an input device which generates control information by moving an object to be detected, comprising:

an image capture section which captures an image of the object to be detected;

an area calculation section which calculates an area of the image captured by the image capture section;

a difference calculation section which calculates a difference between an area of the image of the object to be detected in a frame at least one frame before the current frame and the area calculated by the area calculation section; and a control information output section which outputs the control information corresponding to the calculated difference.

According to a third aspect of the present invention, there is provided an input device which generates control information by moving an object to be detected, comprising:

an image capture section which includes a detection surface and captures an image of the object to be detected which is in contact with the detection surface;

a center-of-gravity calculation section which calculates a center of gravity of the image captured by the image capture section;

a feature point extraction section which extracts a feature point of the captured image;

a center-of-gravity movement detection section which calculates a difference between a center of gravity of an image of the object to be detected in a frame at least one frame before the current frame and the center of gravity calculated by the center-of-gravity calculation section;

a feature point position movement detection section which calculates a second difference between a position of a feature point of an image of the object to be detected in a frame at least one frame before the current frame and a position of the feature point extracted by the feature point extraction section; and a rotation angle detection section which detects a rotation angle around one of a first axis and a second axis which are perpendicular to each other on the detection surface based on the first difference and the second difference, wherein the rotation angle detection section calculates the rotation angle around the second axis by subtracting a first axis direction component of the second difference from a first axis direction component of the first difference, calculates the rotation angle around the first axis by subtracting a second axis direction component of the second difference from a second axis direction component of the first difference, and outputs the control information corresponding to the rotation angle around the first axis or the second axis.

According to a fourth aspect of the present invention, there is provided An information device comprising: any of the above input devices; and a processing section which performs control processing based on the control information from the input device.

According to a fifth aspect of the present invention, there is provided a control information generation method of generating control information by using a captured image of an object to be detected, the control information generation method comprising:

extracting a feature point of an image of the object to be detected;

calculating a difference between a reference position and a position of the feature point; and outputting the control information corresponding to the difference.

According to a sixth aspect of the present invention, there is provided a control information generation method of generating control information by using a captured image of an object to be detected, the control information generation method comprising:

calculating an area of the image of the object to be detected which is in contact with a detection surface;

calculating a difference between the calculated area and an area of an image of the object to be detected in a frame at least one frame before the current frame; and outputting the control information corresponding to the difference in response to the movement of the object to be detected in a direction perpendicular to the detection surface.

According to a seventh aspect of the present invention, there is provided a control information generation method of generating control information by using a captured image of an object to be detected, the control information generation method comprising:

calculating a center of gravity of the image of the object to be detected which is in contact with a detection surface and extracting a feature point of the image;

calculating a difference between the center of gravity and a center of gravity of an image of the object to be detected in a frame at least one frame before the current frame and calculating a difference between a position of the feature point and a position of a feature point of an image of the object to be detected in the frame at least one frame before the current frame;

detecting a rotation angle around one of a first axis and second axis which are perpendicular to each other on the detection surface, based on the difference in the center of gravity and the difference in the feature point; and outputting the control information corresponding to the rotation angle.

DETAILED DESCRIPTION OF THE EMBODIMENT

Embodiments of the present invention are described below. Note that the embodiments described hereunder do not in any way limit the scope of the invention defined by the claims laid out herein. Note also that all of the elements described below should not be taken as essential requirements for the present invention.

An input device provided with improved operability when indicating an arbitrary position in a three-dimensional space has been proposed. In this input device, a reference point is set. In the case where the indicated position is not displayed on the screen, the viewpoint is moved by combination of movement around the reference point and movement along a straight line which connects the reference point with the viewpoint, and the three-dimensional space is regenerated (displayed) from the viewpoint after the movement. In the case where the indicated position appears on the screen, a cursor is moved on the screen (Japanese Patent Application Laid-open No. 5-40571, for example). The above operation makes it unnecessary to perform the operation in the six-axis directions in this input device.

However, it is difficult to apply the input device disclosed in Japanese Patent Application Laid-open No. 5-40571 to a portable information instrument. In the case of applying an input device to a portable information instrument, the input device must have a configuration which allows operation by use of a battery and reduction of the size. It is desirable that the input device having the above-described function be applied not only to a three-dimensional CAD device or a virtual reality experience device which performs advanced information processing, but also to a portable telephone or a PDA while reducing the processing load.

According to the following embodiments, an input device capable of further improving operability without increasing the processing load, an information device, and a control information generation method can be provided.

According to the following embodiments, an input device which is extremely small and lightweight and is capable of further improving operability, an information device, and a control information generation method can be provided.

The embodiments of the present invention are described below in detail with reference to the drawings.

1. Input Device

Figure 1:
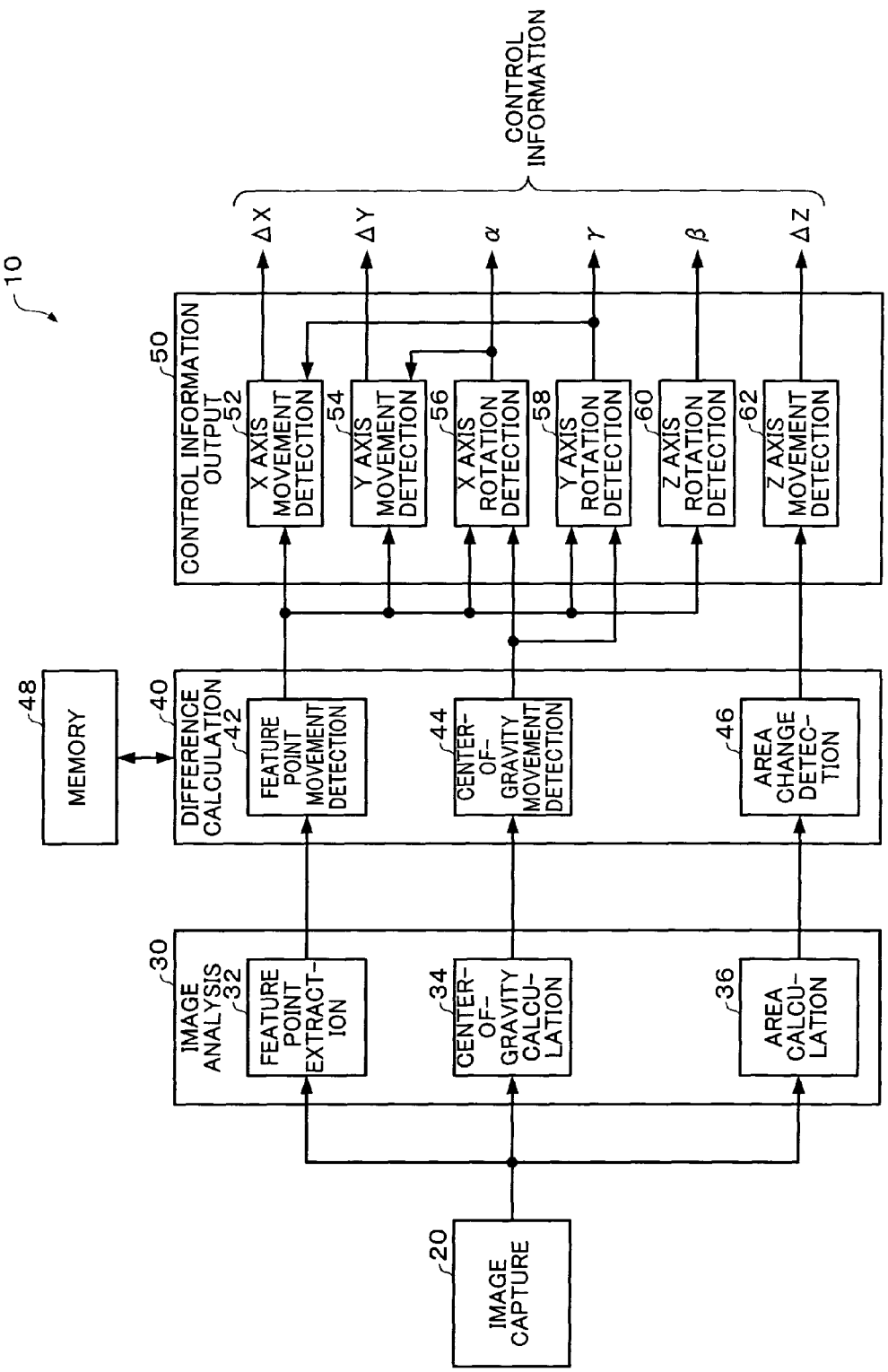
FIG. 1 is a block diagram showing configuration of the input device according to one embodiment of the present invention.

FIG. 1 shows configuration of the input device according to one embodiment of the present invention. An input device 10 in this embodiment is capable of outputting control information (operation information) in the six-axis directions based on the change in a captured image. Therefore, the input device 10 includes an image capture section 20, an image analysis section 30, a difference calculation section 40, and a control information output section 50.

The image capture section 20 captures a two-dimensional or three-dimensional object to be detected which is moved by a user as an image (two-dimensional information) through a detection surface (sensor surface), and generates image information in each frame.

The image analysis section 30 analyzes the image captured by the image capture section 20, and outputs the analysis result to the difference calculation section 40. In more detail, the image analysis section 30 includes a feature point extraction section 32, a center-of-gravity calculation section 34, and an area calculation section 36.

The feature point extraction section 32 extracts a feature point of the image captured by the image capture section 20. The feature point used herein refers to a position (region) characteristic of the image which can be referred to for specifying the moving distance, moving direction, or rotation angle by comparing the images before and after movement.

The center-of-gravity calculation section 34 calculates the center of gravity of the image captured by the image capture section 20 or a position equivalent to the center of gravity. In more detail, the center-of-gravity calculation section 34 calculates the center of the image of an object to be detected or a position equivalent to the center.

The area calculation section 36 calculates the area of the image captured by the image capture section 20 or a value equivalent to the area. In more detail, the area calculation section 36 calculates the area of the object to be detected or a value equivalent to the area of the object to be detected.

The difference calculation section 40 refers to an image in a frame at least one frame before the current frame (given reference position of the image) stored in a memory 48, compares the image with the analysis result from the image analysis section 30, and outputs the difference to the control information output section 50. In more detail, the difference calculation section 40 includes a feature point movement detection section 42, a center-of-gravity movement detection section 44, and an area change detection section 46.

The feature point movement detection section 42 compares the feature point of the image of the object to be detected in the current frame extracted by the feature point extraction section 32 with the feature point of the image of the object to be detected in a frame at least one frame before the current frame stored in the memory 48, and detects the change in position as a difference (second difference). After the difference is calculated, the feature point of the image of the object to be detected in the current frame is stored in the memory 48, and used to detect the change in position of a feature point of an image of the object to be detected in the next frame.

The center-of-gravity movement detection section 44 compares the center of gravity of the image of the object to be detected in the current frame calculated by the center-of-gravity calculation section 34 with the center of gravity of the image of the object to be detected in a frame at least one frame before the current frame stored in the memory 48, and detects the change in the center of gravity as a difference (first difference). After the difference is calculated, the center of gravity of the image of the object to be detected in the current frame is stored in the memory 48, and used to detect the change in the center of gravity of an image of the object to be detected in the next frame.

The area change detection section 46 compares the area of the image of the object to be detected in the current frame calculated by the area calculation section 36 with the area of an image of the object to be detected in a frame at least one frame before the current frame stored in the memory 48, and detects the change in the area as a difference. After the difference is calculated, the area of the image of the object to be detected in the current frame is stored in the memory 48, and used to detect the change in the area of an image of the object to be detected in the next frame.

The control information output section 50 outputs the control information corresponding to the difference between the image of the object to be detected in the current frame and the image of the object to be detected in the frame at least one frame before the current frame which is calculated by the difference calculation section 40. The control information is control information in the six-axis directions as described above.

Figure 2:
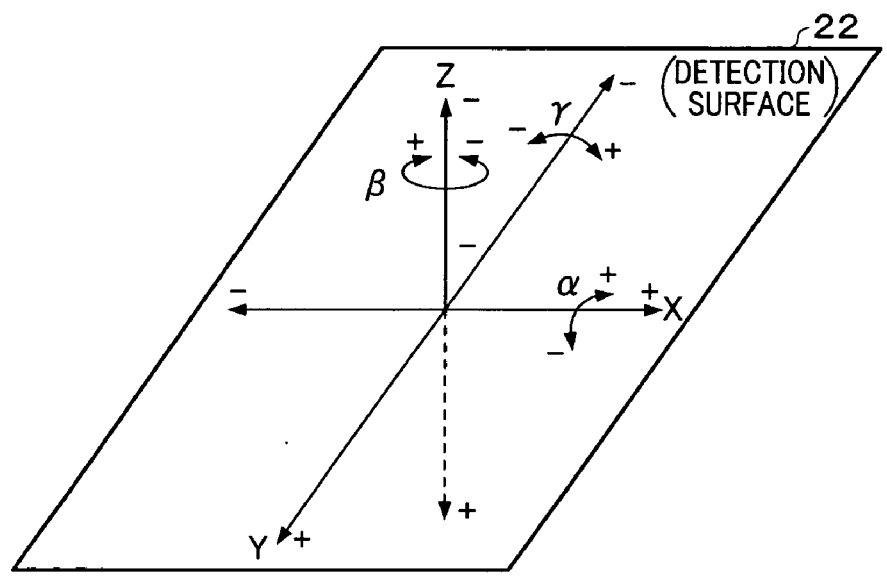
FIG. 2 is a diagram for illustrating control information of six-axis directions.

FIG. 2 is a diagram for illustrating the control information of the six-axis directions. The control information in the six-axis directions is information indicated for the six-axis directions including changes $\Delta x$ and $\Delta y$ in the directions of the X axis and the Y axis (first and second axes) which intersect at right angles on the detection surface (sensor surface) 22 of the image capture section 20 (or on a plane parallel to the detection surface), a change $\Delta z$ in the Z axis (third axis) direction perpendicular to the detection surface, a rotation angle $\alpha$ around the X axis, a rotation angle $\beta$ around the Y axis, and a rotation angle $\gamma$ around the Z axis.

As shown in FIG. 2, a (+) direction and a (−) direction are specified for the change $\Delta x$ in the X axis direction, the change $\Delta y$ in the Y axis direction, the change $\Delta z$ in the Z axis direction, the rotation angle $\alpha$ around the X axis, the rotation angle $\beta$ around the Y axis, and the rotation angle $\gamma$ around the Z axis.

In this embodiment, the movement of the center of gravity of the image of the object to be detected and the movement of the feature point of the image of the object to be detected are used to calculate the rotation angle around each axis in addition to the movement in the X axis, Y axis, and Z axis directions specified on the detection surface while reducing the processing load. Therefore, the control information output section 50 includes an X axis movement detection section 52, a Y axis movement detection section 54, an X axis rotation detection section 56, a Y axis rotation detection section 58, a Z axis rotation detection section 60, and a Z axis movement detection section 62. The control information output section 50 outputs the control information corresponding to output of each section.

The X axis movement detection section 52 detects the movement of the object to be detected on the detection surface in the X axis direction. The X axis movement detection section 52 also detects the moving amount $\Delta x$ of the object to be detected in the X axis direction on the detection surface in the case where the object to be detected is rotated while being slid on the detection surface, taking rotation of the object to be detected around the Y axis into consideration. In more detail, provided that the moving amount of the feature point of the image of the object to be detected in the X axis direction is $\Delta X2$ (first axis direction component of the second difference) and the rotation angle around the Y axis is $\gamma$ (rotation angle around the second axis), the X axis movement detection section 52 calculates the moving amount $\Delta x$ of the object to be detected on the detection surface in the X axis direction as expressed by the following equation (1).

$$\Delta x = \Delta X2 - a \cdot \gamma \text{ (where } 0 \leq a \leq 1) \tag{1}$$

The coefficient a (given first coefficient) is a weighting coefficient of the rotation angle $\gamma$ around the Y axis. If the weighting coefficient a is 0, the rotation angle around the Y axis is not taken into consideration. Therefore, this applies to the output $\Delta x$ in the case where the object to be detected is moved on the detection surface without being rotated. This also applies to the case where the object to be detected is rotated without being slid on the detection surface so that the rotation angle $\gamma$ is output and $\Delta x$ is set to "0". If the weighting coefficient a is 1, this applies to the case where the object to be detected is merely rotated while being slid on the detection surface and is not moved. It is preferable that the weighting coefficient a be determined by adding the user's peculiar operation in the X axis direction, for example.

The Y axis movement detection section 54 detects the movement of the object to be detected on the detection surface in the Y axis direction. The Y axis movement detection section 54 also detects the moving amount of the object to be detected on the detection surface in the Y axis direction in the case where the object to be detected is rotated while being slid on the detection surface, taking rotation of the object to be detected around the X axis into consideration. In more detail, provided that the moving amount of the feature point of the image of the object to be detected in the Y axis direction is $\Delta Y2$ (second axis direction component of the second difference) and the rotation angle around the X axis is a (rotation angle around the first axis), the Y axis movement detection section 54 calculates the moving amount $\Delta y$ of the object to be detected on the detection surface in the Y axis direction as expressed by the following equation (2).

$$\Delta y = \Delta Y2 - b \cdot \alpha \text{ (where } 0 \leq b \leq 1) \tag{2}$$

The coefficient b (given second coefficient) is a weighting coefficient of the rotation angle $\alpha$ around the X axis. If the weighting coefficient b is 0, the rotation angle around the X axis is not taken into consideration. Therefore, this applies to the output $\Delta y$ in the case where the object to be detected is moved on the detection surface without being rotated. This also applies to the case where the object to be detected is rotated without being slid on the detection surface so that the rotation angle $\alpha$ is output and $\Delta y$ is set to "0". If the weighting coefficient b is 1, this applies to the case where the object to be detected is merely rotated while being slid on the detection surface and is not moved. It is preferable that the weighting coefficient b be determined by adding the user's peculiar operation in the Y axis direction, for example.

The X axis rotation detection section 56 detects the rotation angle $\alpha$ around the X axis. In more detail, provided that the moving amount of the center of gravity of the image of the object to be detected in the Y axis direction is $\Delta Y1$ (second axis direction component of the first difference) on condition that the rotational radius is sufficiently large or the rotation angle is sufficiently small, the X axis rotation detection section 56 calculates the rotation angle $\alpha$ around the X axis as expressed by the following equation (3).

$$\alpha \approx -(\Delta Y1 - \Delta Y2) \tag{3}$$

The negative sign is added to the equation (3) depending on the positive and negative directions of the rotation angle specified in FIG. 2. Therefore, if the positive and negative directions of the rotation angle $\alpha$ in FIG. 2 are reversed, the sign of the equation (3) becomes positive.

The X axis rotation detection section 56 may calculate the rotation angle $\alpha$ around the X axis from the equations (2) and (3) based on the moving amount $\Delta Y2$ of the feature point of the image of the object to be detected in the Y axis direction (difference calculated by the feature point movement detection section 42) and the moving amount $\Delta Y1$ of the center of gravity of the image of the object to be detected in the Y axis direction (difference calculated by the center-of-gravity movement detection section 44).

The Y axis rotation detection section 58 detects the rotation angle $\gamma$ around the Y axis. In more detail, provided that the moving amount of the center of gravity of the image of the object to be detected in the X axis direction is $\Delta X1$ (first axis direction component of the first difference) on condition that the rotational radius is sufficiently large or the rotation angle is sufficiently small, the Y axis rotation detection section 58 calculates the rotation angle $\gamma$ around the Y axis as expressed by the following equation (4).

$$\gamma \approx \Delta X1 - \Delta X2 \tag{4}$$

The Z axis rotation detection section 60 detects the rotation angle $\beta$ around the Z axis. In more detail, in the case where the feature points of the images of the object to be detected before and after movement are associated with each other by rotating the feature point around a given reference point, the Z axis rotation detection section 60 calculates the angle at which the feature point is rotated around the reference point as the rotation angle $\beta$.

The Y axis rotation detection section 58 may calculate the rotation angle $\gamma$ around the Y axis from the equations (1) and (4) based on the moving amount $\Delta X2$ of the feature point of the image of the object to be detected in the X axis direction (difference calculated by the feature point movement detection section 42) and the moving amount $\Delta X1$ of the center of gravity of the image of the object to be detected in the X axis direction (difference calculated by the center-of-gravity movement detection section 44).

The Z axis movement detection section 62 detects the movement of the object to be detected in the direction perpendicular to the detection surface. In more detail, the Z axis movement detection section 62 calculates the moving amount $\Delta z$ in the Z axis direction by utilizing a phenomenon in which the image of the object to be detected changes depending on the pressure applied to the detection surface. Provided that the area of the image of the object to be detected before movement is S1 and the area of the image of the object to be detected after movement is S2, the Z axis movement detection section 62 calculates the moving amount $\Delta z$ in the Z axis direction as expressed by the following equation (5).

$$\Delta z = c \cdot (S1 - S2) \tag{5}$$

The coefficient c is a coefficient for associating the change in the area of the image of the object to be detected with the moving amount in the Z axis direction. It is preferable that the coefficient c be determined by adding the user's peculiar operation in the Z axis direction, for example.

The input device is described below in detail. The input device described below uses a fingerprint sensor. However, the present invention is not limited thereto.

Figure 3:
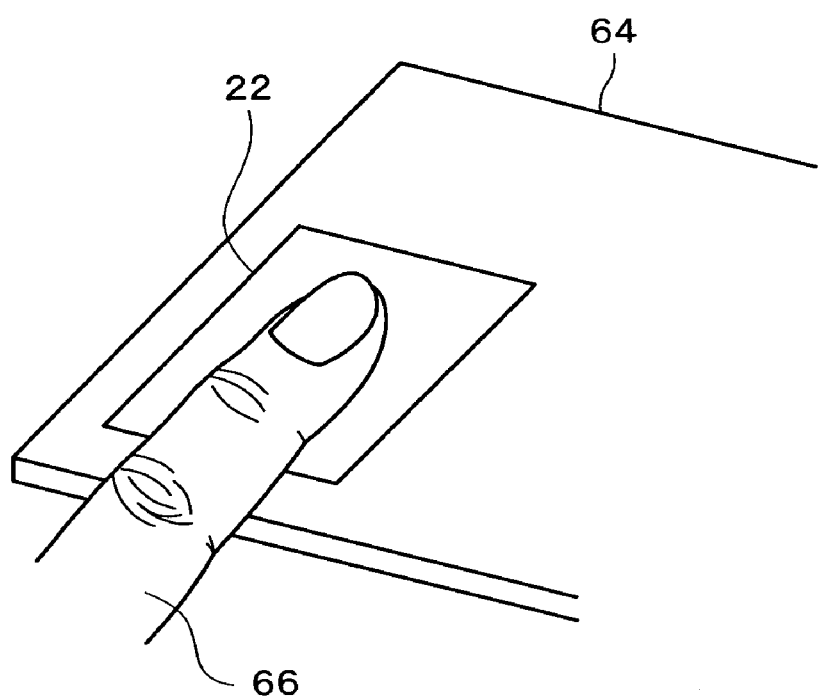
FIG. 3 is a diagram schematically showing the input device using a fingerprint sensor.

FIG. 3 schematically shows the input device having a fingerprint sensor. The input device is mounted on an IC card (or an information device in a broad sense) 64 is shown in this figure. The IC card 64 includes a CPU and a memory device. This enables the IC card 64 to be provided with improved security protection and to store a large amount of advanced information by information processing. Information processing in which various types of operation of the user are reflected can be performed by using an extremely small and lightweight configuration by using the input device in this embodiment.

In FIG. 3, a fingerprint image is captured by allowing a finger (object to be detected in a broad sense) 66 of the user on which a fingerprint pattern is formed to come in contact with the detection surface 22 of the fingerprint sensor as the input device. The control information corresponding to movement of the finger 66 by the user in the six-axis directions which is detected in the three-dimensional space specified on the detection surface 22 is output. Processing based on the control information is performed in the IC card 64. In the case where a liquid crystal panel is provided to the IC card 64, display control such as movement of a pointer displayed on the liquid crystal panel or scrolling of the display image is performed. In the case where the input device is applied to a three-dimensional CAD device, rotation of the object of operation or movement of the viewpoint is controlled.

Figure 4:
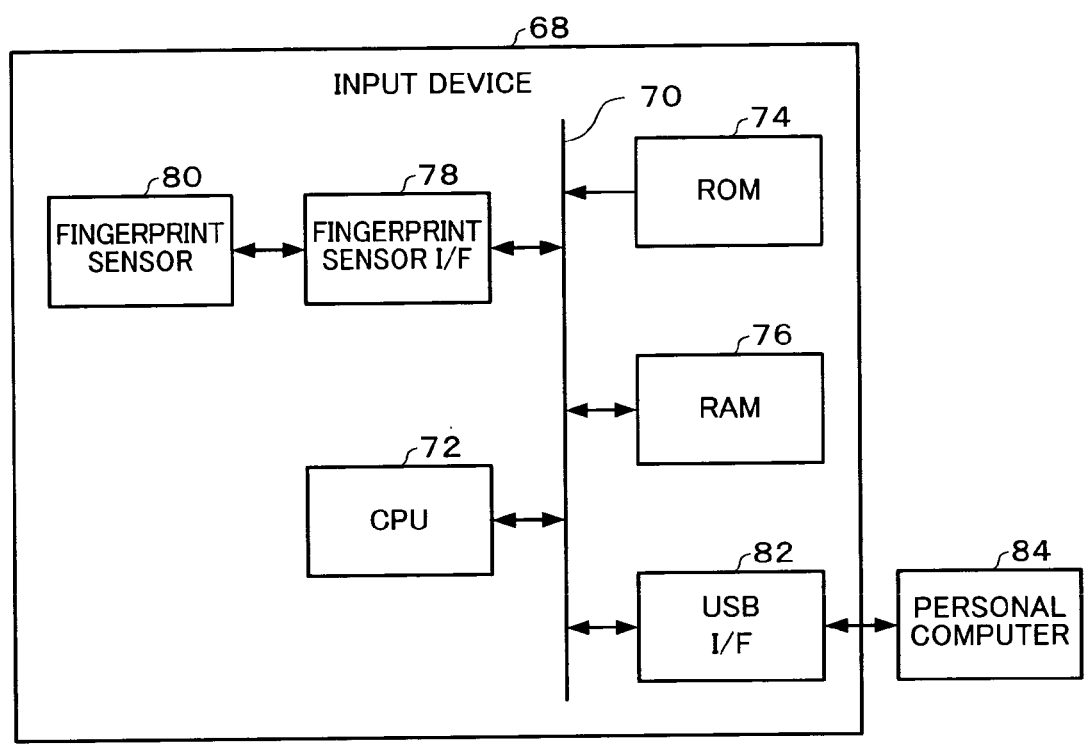
FIG. 4 is a block diagram showing hardware configuration of the input device.

FIG. 4 shows hardware configuration of the input device. In an input device 68, a CPU 72, a ROM 74, a RAM 76, and a fingerprint sensor interface (I/F) circuit 78 are connected with a bus 70. A fingerprint sensor 80 is connected with the fingerprint sensor I/F circuit 78. A USB I/F circuit 82 is connected with the bus 70. The USB I/F circuit 82 is connected with a host device or a peripheral device defined in the USB standard such as a personal computer 84 outside the input device.

The function of the image capture section 20 shown in FIG. 1 is mainly realized by the fingerprint sensor 80 and the fingerprint sensor I/F circuit 78. A fingerprint image captured by the fingerprint sensor 80 is stored in the RAM 76 through the fingerprint sensor I/F circuit 78. The functions of the image analysis section 30, the difference calculation section 40, and the control information output section 50 shown in FIG. 1 are realized by the CPU 72 and a software program stored in the ROM 74 or RAM 76. The function of the memory 48 shown in FIG. 1 is realized by the RAM 76.

1.1 Fingerprint Sensor

Figure 5:
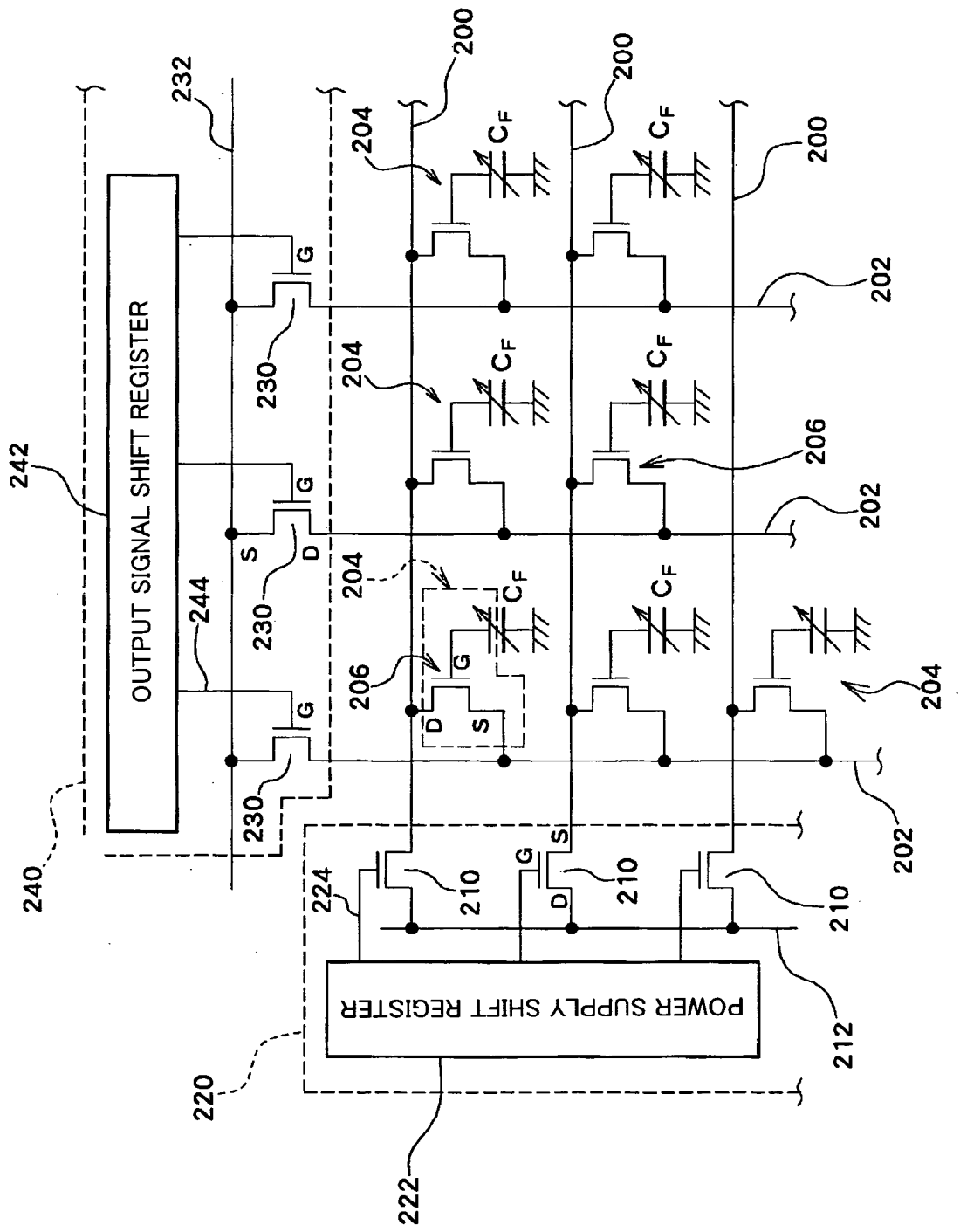
FIG. 5 is a circuit diagram showing the fingerprint sensor.

FIG. 5 shows an example of the fingerprint sensor 80. In FIG. 5, the fingerprint sensor 80 includes M (M is an integer of two or more) power supply lines 200 and N (N is an integer of two or more) output lines 202. A capacitance detection element 204 is provided at each intersecting point of the M power supply lines 200 and the N output lines 202. The capacitance detection element 204 shown in FIG. 5 is illustrated as a closed circuit when a finger is in contact with the capacitance detection element 204. The capacitance detection element 204 includes a variable capacitor $C_F$ of which the capacitance is changed depending on a ridge/valley pattern of a finger, and a signal amplification element such as a signal amplification MIS thin film semiconductor device (hereinafter abbreviated as "signal amplification TFT") 206. If a finger is not in contact with the capacitance detection element 204, a grounding terminal of the variable capacitor $C_F$ is in an open state. The variable capacitor $C_F$ is described later.

The M power supply lines 200 are connected with drains D of the N signal amplification TFTs 206 arranged along the corresponding row. The M power supply lines 200 are connected with a common power supply line 212 through M power supply pass gates 210. Specifically, the power supply pass gate 210 is formed by using a MIS thin film semiconductor device. A source S of the power supply pass gate 210 is connected with the power supply line 200, and a drain D of the power supply pass gate 210 is connected with the common power supply line 212. A power supply shift register 222 is provided to a power supply select circuit 220 in addition to the M power supply pass gates 210 and the common power supply line 212. A gate G of each of the M power supply pass gates 210 is connected with a power supply select output line 224 of the power supply shift register 222.

The N output lines 202 are connected with sources S of the N signal amplification TFTs 206 arranged along the corresponding column. The N output lines 202 are connected with a common output line 232 through N output signal pass gates 230. Specifically, the output signal pass gate 230 is formed by using an MIS thin film semiconductor device. A drain D of the output signal pass gate 230 is connected with the output line 202, and a source S of the output signal pass gate 230 is connected with the common output line 232. An output signal shift register 242 is provided to an output signal select circuit 240 in addition to the N output signal pass gates 230 and the common output line 232. A gate G of the output signal pass gate 230 is connected with an output select output line 244 of the output signal shift register 242.

Figure 6:
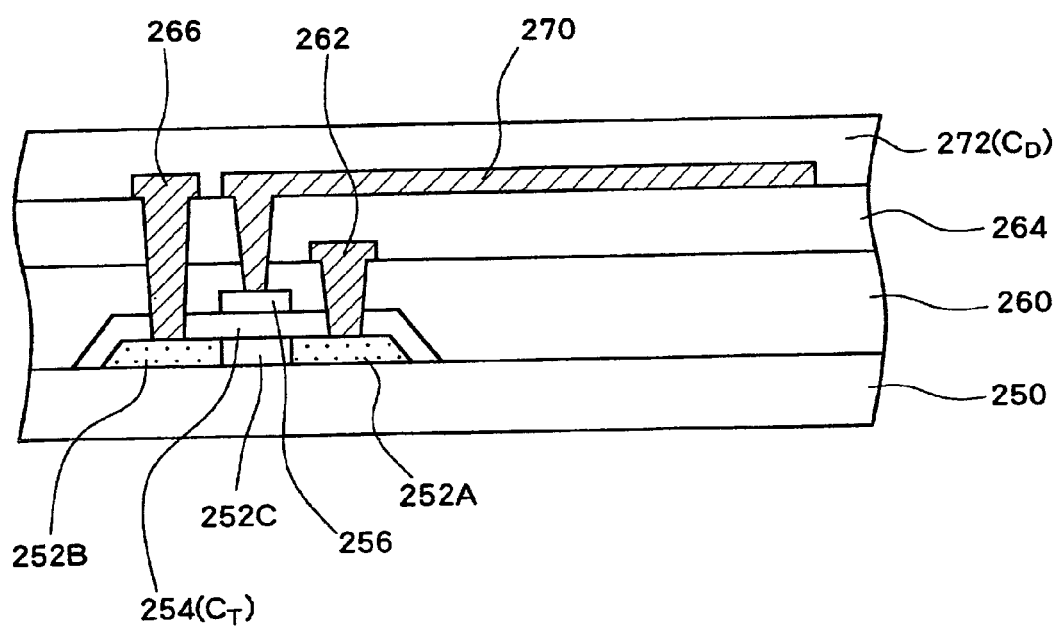
FIG. 6 is a cross-sectional view showing the capacitance detection element.

FIG. 6 is a cross-sectional view showing the capacitance detection element 204 shown in FIG. 5. A finger is not in contact with the capacitance detection element 204 in this figure. The capacitance detection element 204 includes a signal detection element 208 in addition to the signal amplification TFT 206 which is the signal amplification element.

In FIG. 6, a semiconductor film 252 including a source region 252A, a drain region 252B, and a channel region 252C present between the source region 252A and the drain region 252B is formed on an insulating layer 250. A gate insulating film 254 is formed on the semiconductor film 252. A gate electrode 256 is formed in a region which faces the channel region 252C with the gate insulating film 254 interposed therebetween. The semiconductor film 252, the gate insulating film 254, and the gate electrode 256 make up the signal amplification TFT 206. The power supply pass gate 210 and the output signal pass gate 230 are formed in the same manner as the signal amplification TFT 206.

The signal amplification TFT 206 is covered with a first interlayer dielectric 260. A first interconnect layer 262 corresponding to the output line 202 shown in FIG. 5 is formed on the first interlayer dielectric 260. The first interconnect layer 262 is connected with the source region 252A of the signal amplification TFT 206.

The first interconnect layer 262 is covered with a second interlayer dielectric 264. A second interconnect layer 266 corresponding to the power supply line 200 shown in FIG. 5 is formed on the second interlayer dielectric 264. The second interconnect layer 266 is connected with the drain region 252B of the signal amplification TFT 206. As another structure differing from the structure shown in FIG. 6, the second interconnect layer 266 may be formed on the first interlayer dielectric 260, and the first interconnect layer 262 may be formed on the second interlayer dielectric 264.

A capacitance detection electrode 270 is formed on the second interlayer dielectric 264. A capacitance detection dielectric film 272 is formed to cover the capacitance detection electrode 270. The capacitance detection dielectric film 272 is located on the outermost surface of the fingerprint sensor 80 and functions as a protective film. A finger comes in contact with the capacitance detection dielectric film 272. The signal detection element 208 is made up of the capacitance detection electrode 270 and the capacitance detection dielectric film 272.

1.1.1 Fingerprint Detection Operation

A fingerprint is detected by allowing a finger to come in contact with the capacitance detection dielectric film 272 shown in FIG. 6. A start switch (pressure-sensitive switch, for example) 42 of the fingerprint sensor 80 is operated to allow a power supply inside the input device 68 to be operated, whereby power is automatically supplied to the fingerprint sensor 80. The input device 68 may be provided to the personal computer 84, and power may be supplied from a power supply section of the personal computer 84.

In this embodiment, a signal is sequentially removed from the M×N capacitance detection elements 204 by providing a power supply voltage to one of the M power supply lines 200 shown in FIG. 5 and detecting a signal from one of the N output lines 202.

The fingerprint detection operation is roughly divided into (1) a case where a ridge (projecting section) of the fingerprint pattern comes in contact with the capacitance detection dielectric film 272, and (2) a case where a valley (recess section) of the fingerprint pattern faces the capacitance detection dielectric film 272.

(1) Case where Ridge (Projecting Section) of Fingerprint Pattern Comes in Contact with Capacitance Detection Dielectric Film 272

Figure 7:
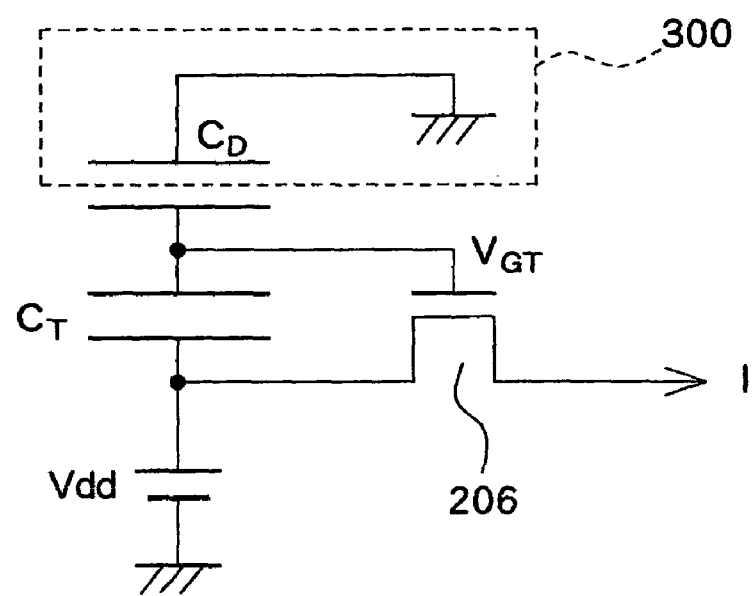
FIG. 7 is an equivalent circuit diagram of the capacitance detection element when a ridge of a fingerprint touches the capacitance detection element.

FIG. 7 shows an equivalent circuit of the capacitance detection element 204 in this case. A symbol 300 corresponds to a ridge of a human fingerprint. A grounding electrode 300 which faces the capacitance detection electrode 270 shown in FIG. 6 with the dielectric film 272 interposed therebetween is formed in a region indicated by the symbol 300. A power supply voltage Vdd is supplied from the common power supply line 212. A symbol $C_T$ indicates a transistor capacitor of the signal amplification TFT 206. A symbol $C_D$ indicates a capacitor between the detection electrode 270 and the grounding electrode (finger) 300.

The length of the gate electrode of the signal amplification TFT 206 is referred to as L (μm), the width of the gate electrode is referred to as W (μm), the thickness of the gate insulating film is referred to as tox (μm), the relative dielectric constant of the gate insulating film is referred to as ∈ox, and the dielectric constant under vacuum is referred to as ∈o. The capacitance of the transistor capacitor $C_T$ is expressed by the following equation (6).

$$C_T = \epsilon o \cdot \epsilon ox \cdot L \cdot W / tox \tag{6}$$

The area of the capacitance detection electrode 270 is referred to as S (μm²), the thickness of the capacitance detection dielectric film 272 is referred to as td (μm), and the relative dielectric constant of the capacitance detection dielectric film 272 is referred to as ∈d. The capacitance of the capacitor $C_D$ is expressed by the following equation (7).

$$C_D = \epsilon o \cdot \epsilon d \cdot S / td \tag{7}$$

In the equivalent circuit shown in FIG. 7, a voltage $V_{GT}$ applied to the gate of the signal amplification TFT 206 is expressed as follows.

$$V_{GT} = Vdd/(1+C_D/C_T) \tag{8}$$

If the capacitance of the capacitor $C_D$ is set sufficiently greater than the capacitance of the transistor capacitor $C_T$ ($C_D > 10 \times C_T$, for example), the denominator in the equation (8) becomes infinite, whereby $V_{GT}$ is approximated as follows.

$$V_{GT} \approx 0 \tag{9}$$

As a result, the signal amplification TFT 206 is in an off state since almost no voltage is applied to the gate of the signal amplification TFT 206. Therefore, a current I which flows between the source and the drain of the signal amplification TFT 206 is extremely decreased. Therefore, the measurement point can be judged to be the ridge (projecting section) of the fingerprint pattern by measuring the current I.

(2) Case where Valley (Concave Section) of Fingerprint Pattern Faces Capacitance Detection dielectric Film 272

Figure 8:
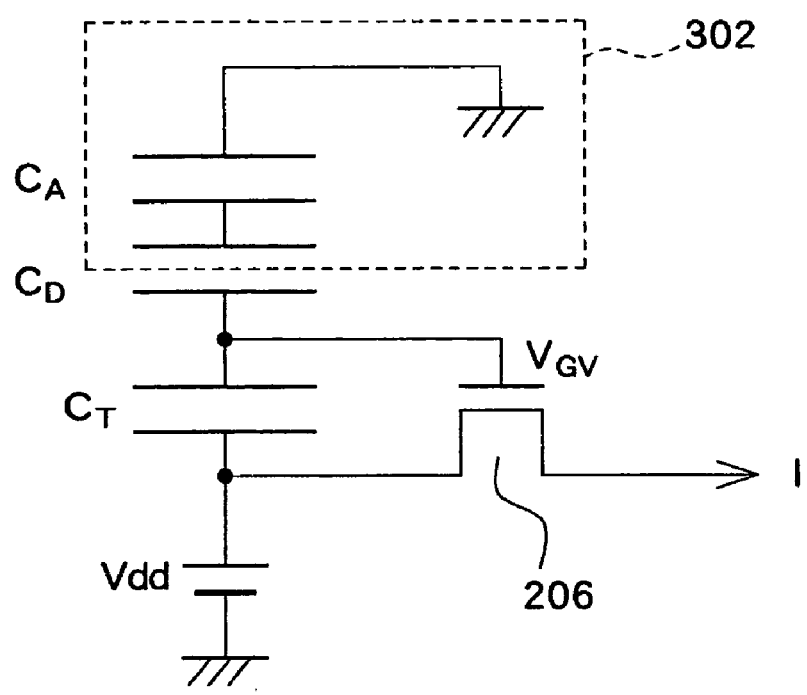
FIG. 8 is an equivalent circuit diagram of the capacitance detection element when a valley of a fingerprint faces the capacitance detection element.

FIG. 8 shows an equivalent circuit of the capacitance detection element 204 in this case. A symbol 302 corresponds to a valley of a human fingerprint. In this case, a capacitor $C_A$ in which air is a dielectric is formed between the dielectric film 272 and the valley of the fingerprint in addition to the capacitor $C_D$ shown in FIG. 7.

In the equivalent circuit shown in FIG. 8, a voltage $V_{GV}$ applied to the gate of the signal amplification TFT 206 is expressed as follows.

$$V_{GV} = Vdd/\{[1+(1/C_T)] \times 1/[(1/C_D)+(1/C_A)]\} \tag{10}$$

If the capacitance of the capacitor $C_D$ is set sufficiently greater than the capacitance of the transistor capacitor $C_T$ ($C_D > 10 \times C_T$, for example), the equation (10) is approximated as follows.

$$V_{GV} \approx Vdd/[1+(C_A/C_T)] \tag{11}$$

If the capacitance of the transistor capacitor $C_T$ is set sufficiently greater than the capacitance of the capacitor $C_A$ formed by the valley of the fingerprint ($C_T > 10 \times C_A$, for example), the equation (11) is approximated as follows.

$$V_{GV} \approx Vdd \tag{12}$$

As a result, the signal amplification TFT 206 is in an on state since the power supply voltage Vdd is applied to the gate of the signal amplification TFT 206. Therefore, the current I which flows between the source and the drain of the signal amplification TFT 206 is extremely increased. Therefore, the measurement point can be judged to be the valley (recess section) of the fingerprint pattern by measuring the current I.

The variable capacitor $C_F$ shown in FIG. 5 has a capacitance equal to the capacitance of the capacitor $C_D$ when the ridge of the fingerprint is in contact with the capacitance detection dielectric film 272, and has a capacitance equal to the sum of the capacitance of the capacitor $C_D$ and the capacitance of the capacitor $C_A$ when the valley of the fingerprint faces the capacitance detection dielectric film 272. Therefore, the capacitance of the variable capacitor $C_F$ varies corresponding to the ridge and valley of the fingerprint. The ridge or valley of the fingerprint can be detected by detecting the current based on the change in capacitance corresponding to the ridge and valley of the fingerprint.

Figure 9A:
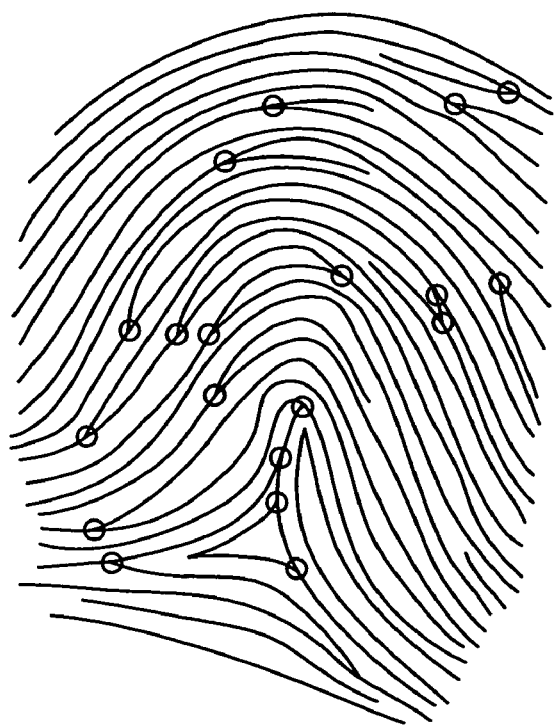
FIGS. 9A and 9B are diagrams showing feature points of a fingerprint.
Figure 9B:
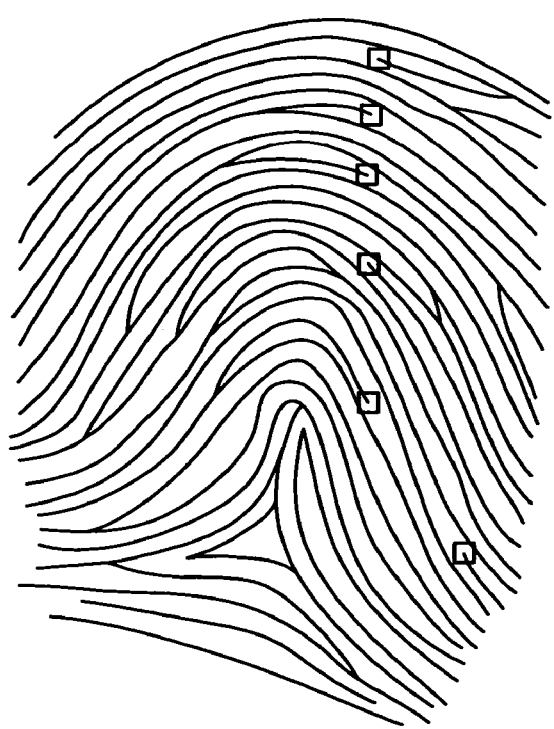

A fingerprint pattern can be detected by carrying out the above-described operation in each of the M×N capacitance detection elements 204 by time division. In more detail, the ridge or valley of the fingerprint is sequentially detected in the capacitance detection elements located in each column in the first row, and the ridge or valley of the fingerprint is then detected in the second row. The ridge or valley of the fingerprint is detected in pixel units in this manner. This enables a fingerprint image as shown in FIGS. 9A and 9B to be obtained, for example. In this embodiment, fingerprint images are periodically captured by using the fingerprint sensor 80.

In the case where a positive power supply is used as the power supply voltage Vdd, the signal amplification TFT 206 is formed by using an enhancement N-type transistor in which a drain current does not flow at a gate voltage of about zero. Provided that the gate voltage at which the drain current is minimum (minimum gate voltage) in the transfer characteristics of the signal amplification TFT 206 is Vmin, $C_D > 10 \times C_T$ is satisfied by satisfying 0<Vmin<0.1×Vdd.

In the case where a negative power supply is used as the power supply voltage Vdd, the signal amplification TFT 206 is formed by using an enhancement P-type transistor in which a drain current does not flow at a gate voltage of about zero. Provided that the gate voltage at which the drain current is minimum (minimum gate voltage) in the transfer characteristics of the signal amplification TFT 206 is Vmin, $C_D > 10 \times C_T$ is satisfied by satisfying 0.1×Vdd<Vmin<0.

In this embodiment, the control information is output by using thus captured fingerprint image in this manner. In this case, the processing load is reduced by using feature points (minutiae points) of the captured fingerprint image.

FIGS. 9A and 9B show examples of feature (or minutiae) points of a fingerprint. FIG. 9A shows ridge bifurcations of a fingerprint. FIG. 9B shows ridge endings of a fingerprint. Ridge bifurcations, for example, are extracted from a fingerprint image captured by the fingerprint sensor 80. In FIGS. 9A and 9B, the fingerprint image shows ridges (projections) of the fingerprint. A ridge bifurcation is a portion at which a ridge divides into two or more branches. A ridge ending is a portion at which a ridge ends.

Since forms of fingerprints are not identical, distribution of ridge bifurcations or ridge endings of a fingerprint differs between individuals. Therefore, if ridge bifurcations or ridge endings can be determined, it suffices to merely compare the distribution of the ridge bifurcations or the ridge endings. This reduces the amount of information to be compared, whereby the load of comparison processing can be reduced.

1.2 Operation Flow

Figure 10:
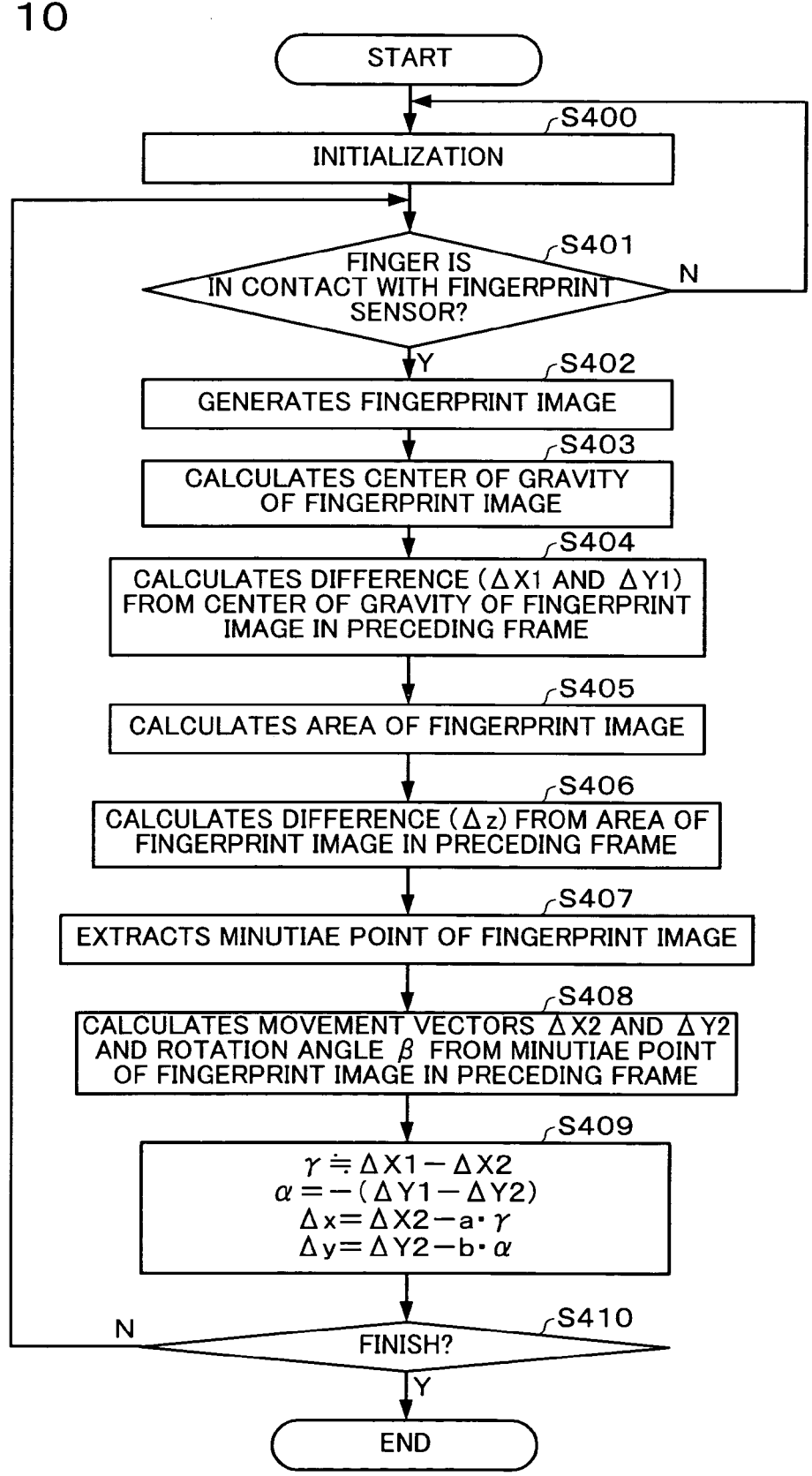
FIG. 10 is a flowchart showing a processing flow of the input device.

FIG. 10 shows a processing flow of the input device in this embodiment. A program for executing the processing shown in FIG. 10 is, stored in the ROM 74 or RAM 76. The CPU 72 performs processing according to the program.

The CPU 72 initializes each variable before performing the processing as the input device (step S400).

Whether or not a finger (or an object to be detected) of a user is in contact with the detection surface of the fingerprint sensor 80 is judged (step S401). If it is determined that no finger is in contact with the detection surface (step S401: N), the operation is returned to the step S400.

If it is determined that a finger is in contact with the detection surface (step S401: Y), a fingerprint image is captured (step S402). The captured fingerprint image for one frame is stored in the RAM 76.

The CPU 72 reads the fingerprint image for one frame stored in the RAM 76, and calculates the center of gravity of the fingerprint image (step S403). The center of gravity is the center of a region including a fingerprint pattern in the captured fingerprint image. The center of gravity is calculated as the center of the fingerprint image obtained by integral operations in the X axis direction and in the Y axis direction, for example.

Provided that the coordinates of the center of gravity are ($X_G$, $Y_G$), the center of gravity is calculated as shown by the following equations.

$$X_G = \sum_i^N i \cdot F(i)/S \quad (13)$$

$$Y_G = \sum_j^M j \cdot G(j)/S \quad (14)$$

$$S = \sum_i^N F(i) = \sum_j^M G(j) \quad (15)$$

S is the area of the fingerprint image, F(i) is the number of dots detected on the output line i, and G(j) is the number of dots detected on the power supply line j.

The center of gravity of the fingerprint image in the current frame is compared with the center of gravity of the fingerprint image in the preceding frame (step S404). The component X and the component Y of the difference between the center of gravity of the fingerprint image in the current frame and the center of gravity of the fingerprint image in the preceding frame are output as the moving amount $\Delta X1$ of the center of gravity in the X axis direction and the moving amount $\Delta Y1$ of the center of gravity in the Y axis direction, respectively. The center of gravity of the fingerprint image in the preceding frame has been stored in the RAM 76. The center of gravity of the fingerprint image in the preceding frame is updated by the center of gravity of the fingerprint image in the current frame calculated in the step S403 after the comparison processing in the step S404. In this example, the fingerprint image in the preceding frame is used as the object for comparison. However, the present invention is not limited thereto. The fingerprint image in a frame at least two frames before the current frame (image of the object to be detected in a frame at least two frames before the current frame) may be used as the object for comparison.

The area of the captured fingerprint image is calculated (step S405). The area of the fingerprint image may be calculated by the above integral operation. The area of the fingerprint image may be calculated as an equal value by the number of dots (pixels) detected as the ridge or valley of the fingerprint image.

The area of the fingerprint image thus calculated is compared with the area of the fingerprint image in the preceding frame (step S406). The moving amount $\Delta z$ of the finger of the user in the Z axis direction is calculated corresponding to the change in the area between the fingerprint images before and after movement as shown by the equation (5). The area of the fingerprint image in the preceding frame has been stored in the RAM 76. The area of the fingerprint image in the preceding frame is updated by the area of the fingerprint image in the current frame calculated in the step S405 after the comparison processing in the step S406. In this example, the fingerprint image in the preceding frame is used as the object for comparison. However, the present invention is not limited thereto. The fingerprint image in a frame at least two frames before the current frame (image of the object to be detected in a frame at least two frames before the current frame) may be used as the object for comparison.

Figure 11C:
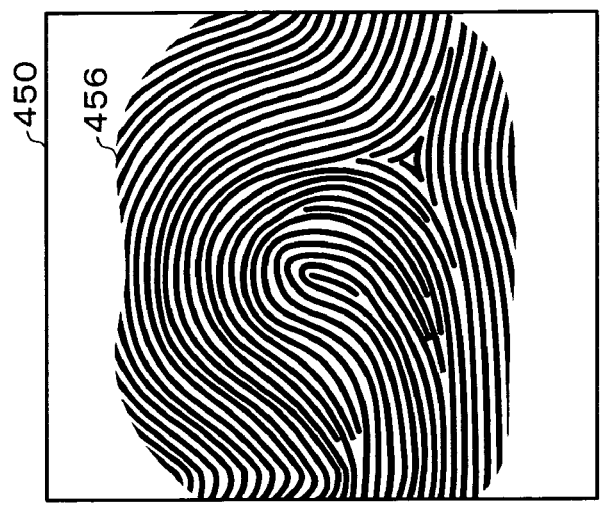
FIGS. 11A, 11B, and 11C are diagrams showing changes in a fingerprint image when a finger is moved in the Z axis direction.
Figure 11B:
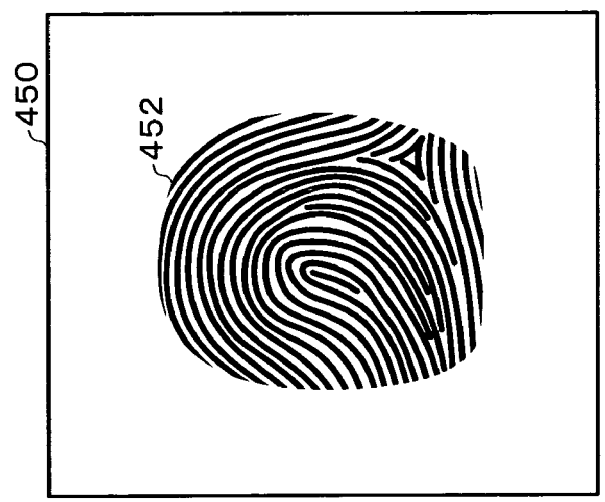
Figure 11A:
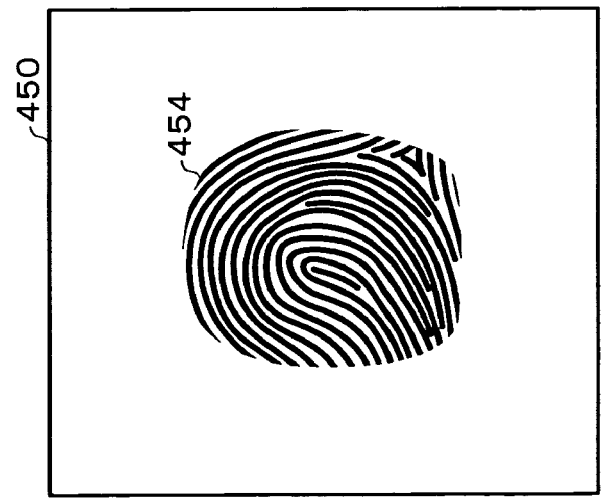

FIGS. 11A, 11B, and 11C show changes in a fingerprint image when a finger is moved in the Z axis direction. A fingerprint image 452 in the frame f shown in FIG. 11B is the original position in a fingerprint image detection region 450. In the case where a fingerprint image captured in the frame (f+1) is a fingerprint image 454 shown in FIG. 11A, the user has moved the finger in the direction in which the finger is pulled up from the detection surface of the fingerprint sensor 80 ((−) direction of the Z axis). Since the finger is moved in the direction in which the pressure applied to the detection surface by the finger is decreased, the area in which the finger is in contact with the detection surface is decreased. In the case where the fingerprint image captured in the frame (f+1) is a fingerprint image 456 shown in FIG. 11C, the user has moved the finger in the direction in which the finger is pressed against the detection surface of the fingerprint sensor 80 ((+) direction of the Z axis). Since the finger is moved in the direction in which the pressure applied to the detection surface by the finger is increased, the area in which the finger is in contact with the detection surface is increased. Therefore, the moving direction and the moving amount of the finger in the Z axis direction can be detected by associating the change in the area of the fingerprint image with the moving amount $\Delta z$ of the finger in the Z axis direction.

The area of the captured fingerprint image can be calculated by using the fingerprint sensor 80 having the configuration shown in FIG. 5.

Figure 12:
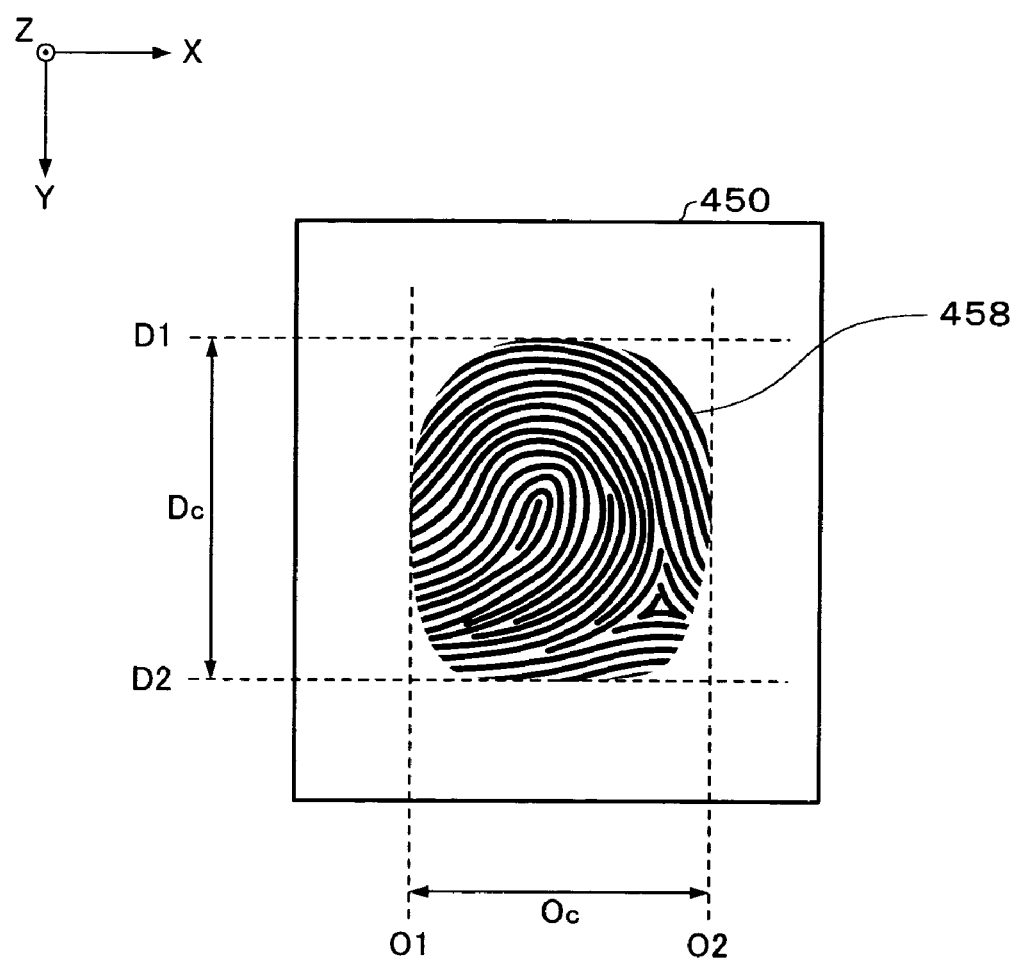
FIG. 12 is a diagram for illustrating a method of reducing the processing load of calculating an area of a fingerprint image.

FIG. 12 is a diagram for illustrating a method of reducing processing load for calculating an area of a fingerprint image. A fingerprint image 458 is captured by allowing the fingerprint sensor 80 shown in FIG. 5 to scan in the fingerprint image detection region 450 in the X axis direction and the Y axis direction. In this case, the number Oc of output lines through which the ridge or valley of the fingerprint is detected can be specified in the X axis direction by an output line O1 at which detection of the ridge or valley of the fingerprint is started and an output line O2 at which the ridge or valley of the fingerprint is detected last. The number Dc of power supply lines through which the ridge or valley of the fingerprint is detected can be specified in the Y axis direction by a power supply line D1 at which detection of the ridge or valley of the fingerprint is started and a power supply line D2 at which the ridge or valley of the fingerprint is detected last. Therefore, a value Sr equivalent to the area of the fingerprint image 458 can be calculated by the number Oc of output lines and the number Dc of power supply lines.

$$Oc=O2-O1+1 \tag{16}$$

$$Dc=D2-D1+1 \tag{17}$$

$$Sr=Oc \cdot Dc \tag{18}$$

Since the rectangle circumscribed on the outline of the captured fingerprint image is easily calculated by specifying the power supply lines and the output lines of the fingerprint sensor 80, the processing load for calculating the area of the fingerprint image can be reduced.

Moreover, the center of gravity of the fingerprint image 458 can be specified in the step S403 based on the intermediate position of the output lines O1 to O2 and the intermediate position of the power supply lines D1 to D2. This enables the processing load for calculating the center of gravity of the fingerprint image 458 to be significantly reduced. Provided that the coordinates of the center of gravity are $(X_M, Y_M)$, the center of gravity is calculated as shown by the following equations.

$$X_M=(O1+O2)/2 \tag{19}$$

$$Y_M=(D1+D2)/2 \tag{20}$$

The description is given with reference to FIG. 10. After the moving amount $\Delta z$ in the Z axis direction is calculated in the step S406, feature points (minutiae points) of the fingerprint image is extracted (step S407). Feature points used herein refer to ridge endings or ridge bifurcations of a fingerprint. Distribution of these feature points is then calculated. This enables movement of the fingerprint image on the detection surface to be detected by the movement of the feature points (or distribution of the feature points).

The feature points of the fingerprint image calculated in the step S407 is compared with the feature points of a fingerprint image in the preceding frame (step S408). The feature points (distributions of the feature points) of the fingerprint image in the current frame and the preceding frame are compared, and the moving amount $\Delta X2$ in the X axis direction, the moving amount $\Delta Y2$ in the Y axis direction, and the rotation angle $\beta$ around the Z axis are calculated so that the similarity of the feature points (distributions of the feature points) is maximized.

Figure 13A:
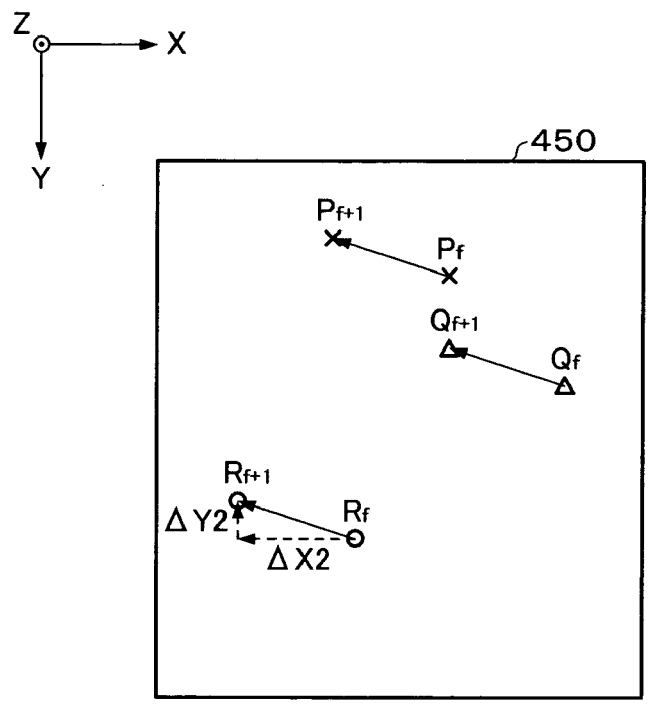
FIGS. 13A and 13B are diagrams showing comparing processing of feature points of a fingerprint.
Figure 13B:
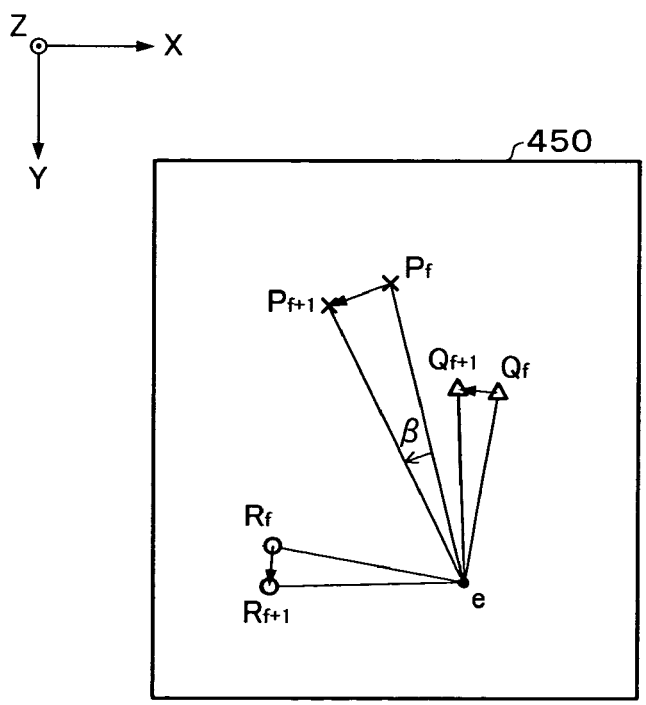

FIGS. 13A and 13B schematically show comparing processing of the feature points. In FIGS. 13A and 13B, feature points $P_f$, $Q_f$, and $R_f$ extracted from the fingerprint image in the frame f are moved to positions of feature points $P_{f+1}$, $Q_{f+1}$, and $R_{f+1}$ of the fingerprint image captured in the frame (f+1). As shown in FIG. 13A, the CPU 72 calculates the moving amount $\Delta X2$ in the X axis direction and the moving amount $\Delta Y2$ in the Y axis direction so that at least the feature points $P_f$, $Q_f$, and $R_f$ among three or more extracted feature points respectively coincide with the corresponding feature points $P_{f+1}$, $Q_{f+1}$, and $R_{f+1}$. As shown in FIG. 13B, the CPU 72 calculates a reference point e and the rotation angle $\beta$ around the Z axis with respect to the reference point e as the center so that at least the feature points $P_f$, $Q_f$, and $R_f$ among three or more extracted feature points respectively coincide with the corresponding feature points $P_{f+1}$, $Q_{f+1}$, and $R_{f+1}$.

Figure 14C:
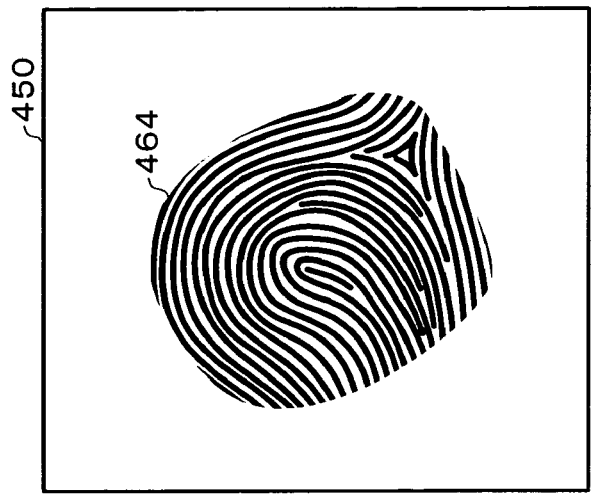
FIGS. 14A, 14B, and 14C are diagrams for illustrating changes in a fingerprint image when a finger is moved around the Z axis.
Figure 14B:
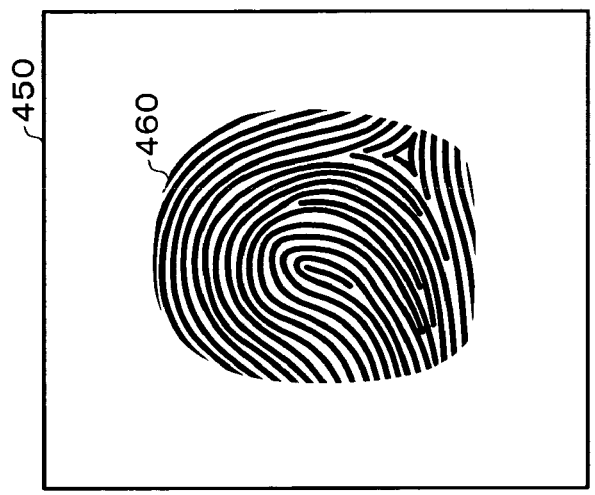
Figure 14A:
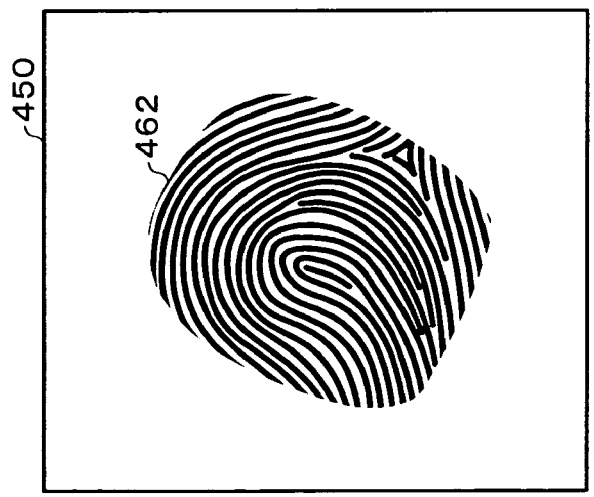

FIGS. 14A, 14B, and 14C show changes in a fingerprint image when a finger is moved around the Z axis. A fingerprint image 462 shown in FIG. 14A corresponds to the case where the finger is rotated around the Z axis in the (−) direction in the fingerprint image detection region 450 with respect to a fingerprint image 460 in the frame f shown in FIG. 14B. A fingerprint image 464 shown in FIG. 14C corresponds to the case where the finger is rotated around the Z axis in the (+) direction.

Therefore, the changes in the fingerprint image shown in FIGS. 14A, 14B, and 14C can be calculated as the rotation angle $\beta$ around the Z axis by performing the comparing processing shown in FIG. 13B, for example.

The description is given with reference to FIG. 10. If the movement vector of the fingerprint image (the moving direction and the moving amount of the feature point of the fingerprint image in the X axis direction and the Y axis direction) is calculated in the step S408, the CPU 72 calculates the rotation angle $\alpha$ around the X axis according to the equation (4), and calculates the rotation angle $\gamma$ around the Y axis according to the equation (3). The CPU 72 calculates the moving amount $\Delta x$ in the X axis direction according to the equation (1), and calculates the moving amount $\Delta y$ in the Y axis direction according to the equation (2) (step S409). If the processing is finished (step S410: Y), processing is terminated (END). If the processing is not finished (step S410: N), the operation is returned to the step S401.

Figure 15C:
FIGS. 15A, 15B, and 15C are diagrams illustrating changes in a fingerprint image when a finger is moved around the Y axis.
Figure 15B:
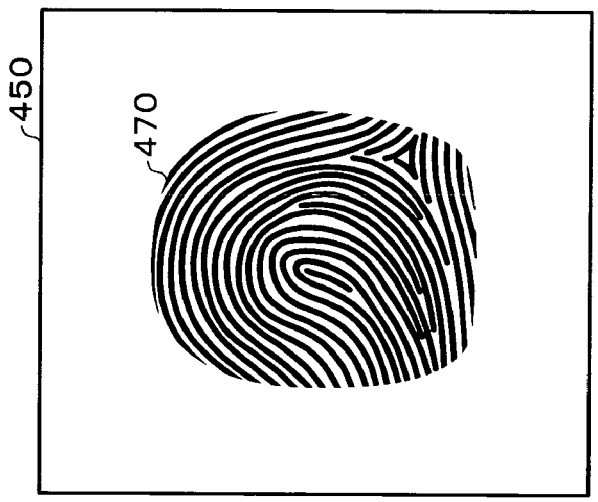
Figure 15A:
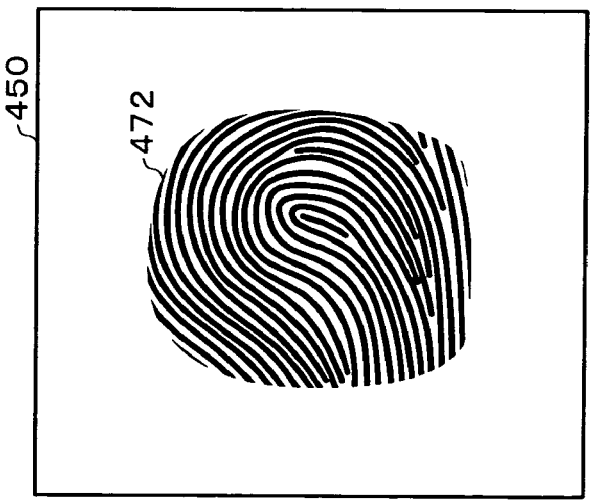

FIGS. 15A, 15B, and 15C show changes in a fingerprint image when a finger is moved around the Y axis. A user rotates the finger around the Y axis while sliding the finger on the detection surface of the fingerprint sensor 80 in these figures. Therefore, the center of gravity of the fingerprint image is changed only to a small extent in FIGS. 15A, 15B, and 15C.

A fingerprint image 472 shown in FIG. 15A corresponds to the case where the finger is rotated around the Y axis in the (−) direction in the fingerprint image detection region 450 with respect to a fingerprint image 470 in the frame f shown in FIG. 15B. Specifically, the feature point of the fingerprint image is moved in the (+) direction of the X axis while the center of gravity of the fingerprint image is changed only to a small extent. A fingerprint image 474 shown in FIG. 15C corresponds to the case where the finger is rotated around the Y axis in the (+) direction. Specifically, the feature point of the fingerprint image is moved in the (−) direction of the X axis while the center of gravity of the fingerprint image is changed only to a small extent. In this case, the rotation angle $\gamma$ corresponding to the moving amount of the feature point of the fingerprint image shown in FIGS. 15A, 15B, and 15C is calculated according to the equation (4).

Figure 16C:
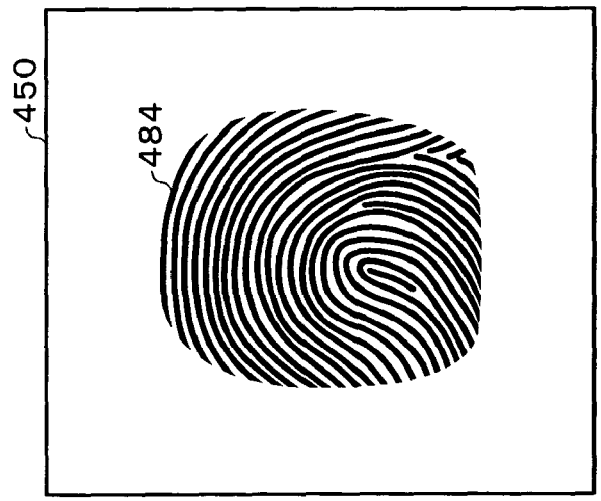
FIGS. 16A, 16B, and 16C are diagrams illustrating changes in a fingerprint image when a finger is moved around the X axis.
Figure 16B:
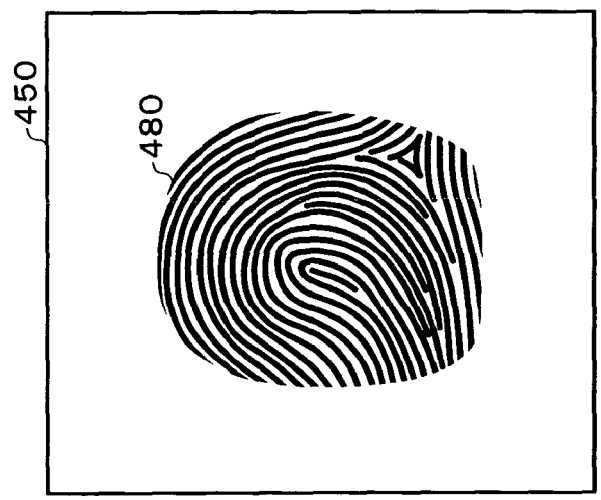
Figure 16A:
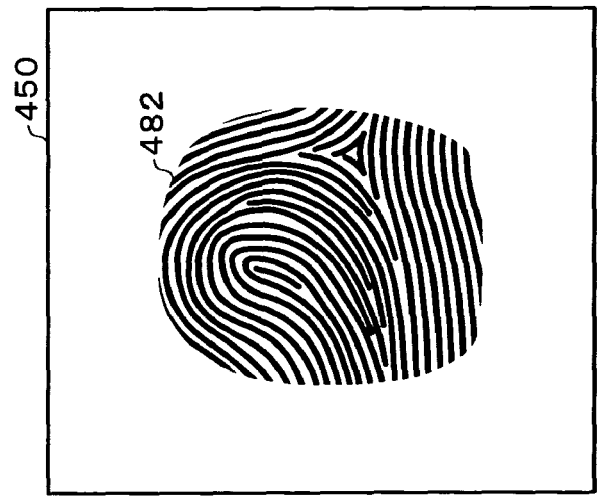

FIGS. 16A, 16B, and 16C show changes in a fingerprint image when a finger is rotated around the X axis. A user rotates the finger around the X axis while sliding the finger on the detection surface of the fingerprint sensor 80 in these figures. Therefore, the center of gravity of the fingerprint image is changed only to a small extent in FIGS. 16A, 16B, and 16C.

A fingerprint image 482 shown in FIG. 16A corresponds to the case where the finger is rotated around the X axis in the (−) direction in the fingerprint image detection region 450 with respect to a fingerprint image 480 in the frame f shown in FIG. 16B. A fingerprint image 484 shown in FIG. 16C corresponds to the case where the finger is rotated around the X axis in the (+) direction. Specifically, the feature point of the fingerprint image is moved in the X axis direction while the center of gravity of the fingerprint image is changed only to a small extent. In this case, the rotation angle $\alpha$ corresponding to the moving amount of the feature point of the fingerprint image shown in FIGS. 16A, 16B, and 16C is calculated according to the equation (3).

Figure 17C:
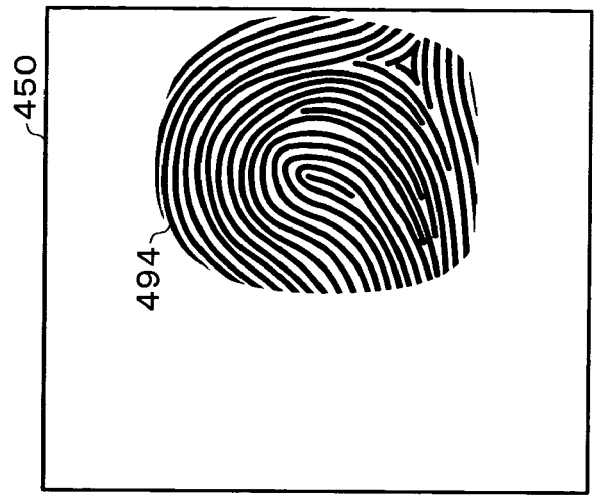
FIGS. 17A, 17B, and 17C are diagrams illustrating changes in a fingerprint image when a finger is moved in the X axis direction.
Figure 17B:
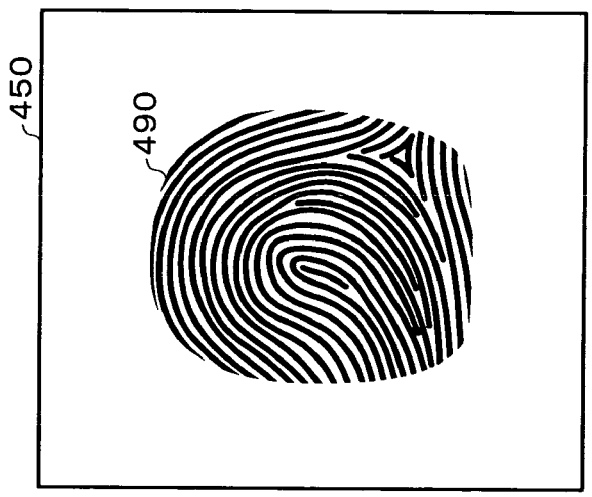
Figure 17A:
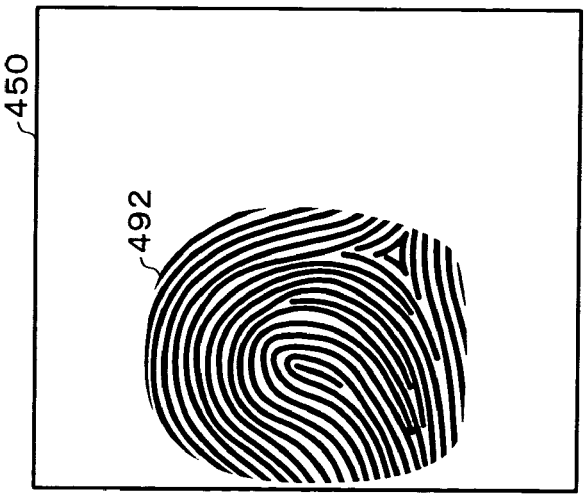

FIGS. 17A, 17B, and 17C show changes in a fingerprint image when a finger is moved in the X axis direction. A user moves the finger in the X axis direction while sliding the finger on the detection surface of the fingerprint sensor 80 in these figures. Therefore, the movement vector of the center of gravity of the fingerprint image almost coincides with the movement vector of the feature point of the fingerprint image in FIGS. 17A, 17B, and 17C.

A fingerprint image 492 shown in FIG. 17A corresponds to the case where the finger is moved in the (−) direction of the X axis direction with respect to a fingerprint image 490 in the frame f shown in FIG. 17B in the fingerprint image detection region 450. A fingerprint image 494 shown in FIG. 17C corresponds to the case where the finger is moved in the (+) direction of the X axis direction. In this case, the moving amount Δx in the X axis direction almost coincides with the moving amount ΔX2 of the feature point of the fingerprint image. However, a value to which the rotation angle γ around the Y axis is added is actually calculated as shown in the equation (1).

Figure 18C:
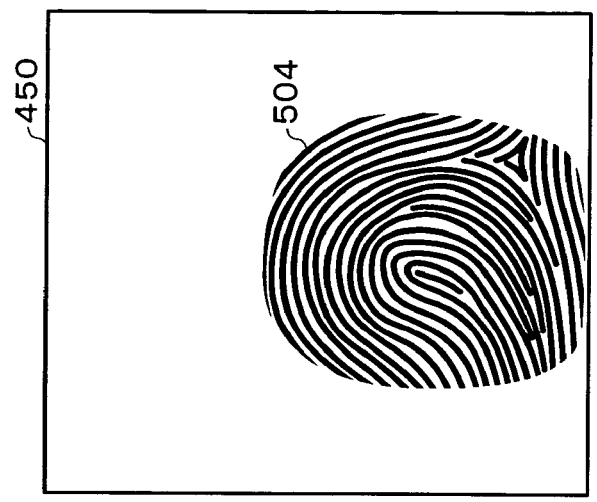
FIGS. 18A, 18B, and 18C are diagrams illustrating changes in a fingerprint image when a finger is moved in the Y axis direction.
Figure 18B:
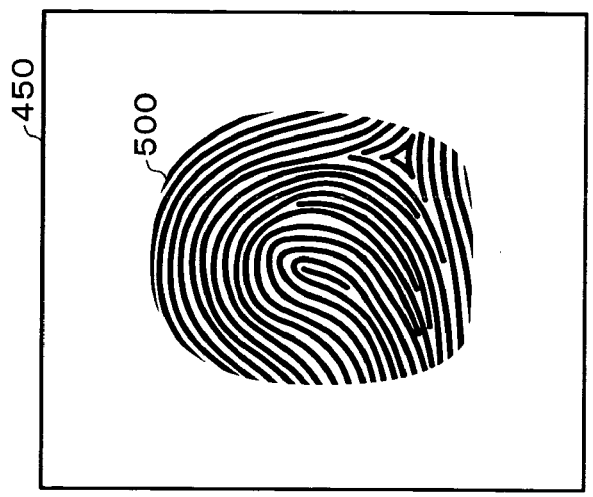
Figure 18A:
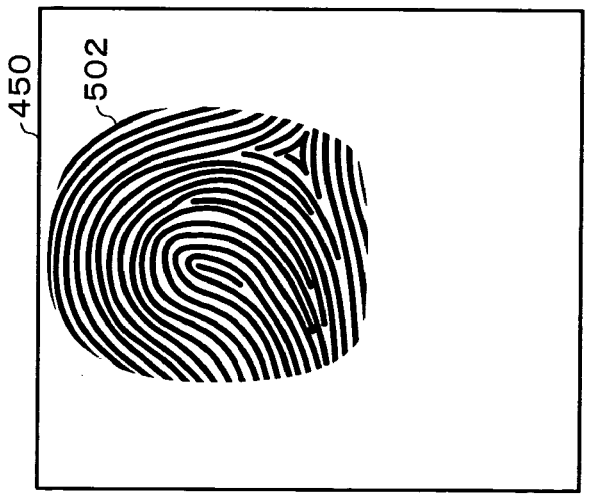

FIGS. 18A, 18B, and 18C show changes in a fingerprint image when a finger is moved in the Y axis direction. A user moves the finger in the Y axis direction while sliding the finger on the detection surface of the fingerprint sensor 80 in these figures. Therefore, the movement vector of the center of gravity of the fingerprint image almost coincides with the movement vector of the feature point of the fingerprint image in FIGS. 18A, 18B, and 18C.

A fingerprint image 502 shown in FIG. 18A corresponds to the case where the finger is moved in the (−) direction of the Y axis direction in the fingerprint image detection region 450 with respect to a fingerprint image 500 in the frame f shown in FIG. 18B. A fingerprint image 504 shown in FIG. 18C corresponds to the case where the finger is moved in the (+) direction of the Y axis direction. In this case, the moving amount Δy in the Y axis direction almost coincides with the moving amount ΔY2 of the feature point of the fingerprint image. However, a value to which the rotation angle α around the X axis is added is actually calculated as shown in the equation (2).

According to the input device in this embodiment, the control information in the six-axis directions can be generated by using a capture image of the object to be detected such as a fingerprint. This enables the provision of an input device enabling the control instruction (movement instruction, for example) in the six-axis directions. In particular, an input device which is highly sensitive, extremely small, and extremely lightweight, consumes only a small amount of electric power, and enables the control instruction in the six-axis directions can be provided by using the capacitance type fingerprint sensor.

MODIFICATION EXAMPLE

In the above embodiment, the moving amount Δx and the moving amount Δy of the object to be detected on the detection surface are detected by using the movement (ΔX2 and ΔY2) of the feature point of the fingerprint image. However, the present invention is not limited thereto.

For example, the difference ($\Delta X_G$ and $\Delta Y_G$) between the center of gravity of the fingerprint image of the object to be detected in the current frame and the center of gravity of the fingerprint image of the object to be detected in a frame at least one frame before the current frame may be calculated by using the X coordinate ($X_G$) and the Y coordinate ($Y_G$) of the center of gravity calculated by using the equations (13) to (15) as the center of gravity of the fingerprint image. In this case, the moving amount Δx in the X axis direction and the moving amount Δy in the Y axis direction of the object to be detected on the detection surface may be expressed by the following equations instead of the equations (1) and (2).

$$\Delta x = \Delta X_G - a \cdot \gamma \quad (21)$$

$$\Delta y = \Delta Y_G - b \cdot \alpha \quad (22)$$

The difference ($\Delta X_G$ and $\Delta Y_G$) between the center of gravity of the fingerprint image of the object to be detected in the current frame and the center of gravity of the fingerprint image of the object to be detected in a frame at least one frame before the current frame may be calculated by using the X coordinate ($X_G$) and the Y coordinate ($Y_G$) of the center of gravity calculated by using the equations (19) and (20) as the center of gravity of the fingerprint image. In this case, the moving amount Δx in the X axis direction and the moving amount Δy in the Y axis direction of the object to be detected on the detection surface may be expressed by the following equations instead of the equations (1) and (2).

$$\Delta x = \Delta X_M - a \cdot \gamma \quad (23)$$

$$\Delta y = \Delta Y_M - b \cdot \gamma \quad (24)$$

In both cases, the control information in the six-axis directions can be generated in the same manner as in the above embodiment. In particular, an input device which is highly sensitive, extremely small, and extremely lightweight, consumes only a small amount of electric power, and enables the control instruction in the six-axis directions can be provided by using the capacitance type fingerprint sensor.

2. Information Device

Figure 19:
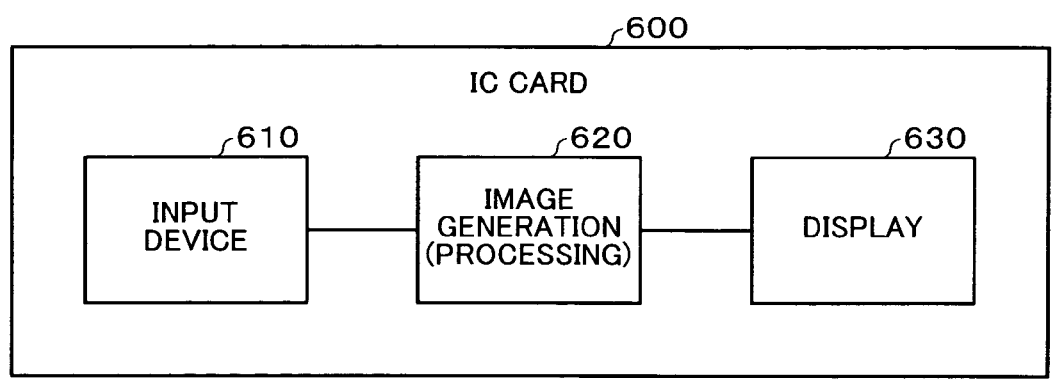
FIG. 19 is a block diagram showing configuration of an IC card.

FIG. 19 shows a block diagram showing configuration of an IC card to which the input device according to this embodiment is applied. An IC card 600 includes an input device 610 using the above-described fingerprint sensor, an image generation section (processing section which performs control processing of a predetermined object of control in a broad sense) 620, and a display section 630. The input device 610 is the input device described with reference to FIG. 1 or 4. The image generation section 620 is realized by a CPU and a software program stored in a ROM or RAM. The display section 630 is realized by an LCD panel and a driver circuit of the LCD panel.

The image generation section 620 generates image data (performs control processing in a broad sense) based on the control information output from the input device 610. In more detail, the image generation section 620 generates image data of an image which is changed corresponding to the movement instruction in the six-axis directions by the input device 610. The display section 630 displays an image based on the image data generated by the image generation section 620.

In the IC card 600 having such a configuration, a pointer displayed in the display section 630 can be moved or an image displayed in the display section 630 can be scrolled by allowing the user to instruct the movement by moving the fingerprint image of the finger in the six-axis directions in the input device 600.

The above description illustrates the case where the IC card is used as an information device. However, the input device according to this embodiment may be applied to a PDA, a portable telephone, a three-dimensional CAD device, a virtual reality experience device, an electronic musical instrument, or the like.

The present invention is not limited to the above-described embodiment. Various modifications can be made within the scope of the present invention.

The above embodiment illustrates the input device using the fingerprint sensor. However, the present invention is not limited thereto. The control information may be output in the same manner as described above by capturing an image of a two-dimensional or three-dimensional object other than a fingerprint. The present invention may also be applied to an input device which does not include a detection surface.

This embodiment illustrates the case where the control information in the six-axis directions is output corresponding to the difference between the current frame and the preceding frame (frame at least one frame before the current frame). However, the present invention is not limited thereto. For example, the difference from the original position as the reference point may be added in each frame, and the absolute value of the difference may be output as the control information in the six-axis directions.

Part of requirements of any claim of the present invention could be omitted from a dependent claim which depends on that claim. Moreover, part of requirements of any independent claim of the present invention could be made to depend on any other independent claim.

Moreover, there can he provided embodiments of the present invention having features as follows.

According to one embodiment of the present invention, there is provided an input device which generates control information by moving an object to be detected, comprising:

an image capture section which captures an image of the object to be detected;

a feature point extraction section which extracts a feature point of the image captured by the image capture section;

a difference calculation section which calculates a difference between a reference position and a position of the feature point; and a control information output section which outputs the control information corresponding to the calculated difference.

In this input device, feature points of an image of the moving object to be detected are extracted, and the control information corresponding to the difference between the reference position and the position of the feature point is output. Therefore, it suffices to merely perform comparison processing using the feature points. This reduces the processing load of the input device which outputs the control information in response to the movement of the image of the object to be detected.

In this input device, the reference position may be a position of a feature point extracted from an image of the object to be detected in a frame at least one frame before the current frame.

According to this input device, since an image of the object to be detected in a frame at least one frame before the current frame is used, the image can be captured in a frame cycle, and the control information can be output in frame units. This enables the control information can be generated with higher accuracy.

According to another embodiment of the present invention, there is provided an input device which generates control information by moving an object to be detected, comprising:

an image capture section which captures an image of the object to be detected;

an area calculation section which calculates an area of the image captured by the image capture section;

a difference calculation section which calculates a difference between an area of the image of the object to be detected in a frame at least one frame before the current frame and the area calculated by the area calculation section; and a control information output section which outputs the control information corresponding to the calculated difference.

According to this input device, the difference in the area of the captured image of the object to be detected between the frames is calculated, and the control information corresponding to the difference is output. Therefore, the control instruction in another axis direction which is not limited to the movement of the position of the captured image can be performed. This enables operability to be further improved.

In this input device, the image capture section may include a detection surface and capture an image of an object to be detected which is in contact with the detection surface; and the control information output section may output the control information corresponding to the moving amount of the object to be detected in an axis direction perpendicular to the detection surface.

According to this input device, since the moving distance of the object to be detected in the axis (Z axis) direction perpendicular to the detection surface can be specified by the change in the area of the image of the object to be detected which is in contact with the detection surface, the control information ($\Delta z$) corresponding not only to the movement in the first and second axis directions which are perpendicular to each other on the detection surface, but also to the movement in the axis direction perpendicular to the first and second axis directions can be generated. This enables operability to be further improved.

According to further embodiment of the present invention, there is provided an input device which generates control information by moving an object to be detected, comprising an image capture section which includes a detection surface and captures an image of the object to be detected which is in contact with the detection surface;

a center-of-gravity calculation section which calculates a center of gravity of the image captured by the image capture section;

a feature point extraction section which extracts a feature point of the captured image;

a center-of-gravity movement detection section which calculates a first difference ($\Delta X1$ and $\Delta Y1$) between a center of gravity of an image of the object to be detected in a frame at least one frame before the current frame and the center of gravity calculated by the center-of-gravity calculation section;

a feature point position movement detection section which calculates a second difference ($\Delta X2$ and $\Delta Y2$) between a position of a feature point of an image of the object to be detected in a frame at least one frame before the current frame and a position of the feature point extracted by the feature point extraction section; and a rotation angle detection section which detects a rotation angle around one of a first axis and a second axis (X axis and Y axis) which are perpendicular to each other on the detection surface based on the first difference and the second difference, wherein the rotation angle detection section calculates the rotation angle ($\gamma$) around the second axis (Y axis) by subtracting a first axis direction component ($\Delta X2$) of the second difference from a first axis direction component ($\Delta X1$) of the first difference, calculates the rotation angle ($\alpha$) around the first axis (X axis) by subtracting a second axis direction component ($\Delta Y2$) of the second difference from a second axis direction component ($\Delta Y1$) of the first difference, and outputs the control information corresponding to the rotation angle around the first axis or the second axis.

In this input device, the rotation angle around the first axis is calculated by subtracting the second axis direction component ($\Delta Y2$) of the second difference from the second axis direction component ($\Delta Y1$) of the first difference, and the rotation angle around the second axis is calculated by subtracting the second axis direction component ($\Delta Y2$) of the second difference from the second axis direction component ($\Delta Y1$) of the first difference. This makes it possible to generate the control information ($\alpha$ and $\gamma$) around the first axis and the second axis relating to the three-dimensional movement (rotation) of the object to be detected from the two-dimensional image of the object to be detected without increasing the processing load. Therefore, an input device which is capable of further improving operability can be provided.

In this input device, the rotation angle detection section may calculate a rotation angle between a feature point of an image of the object to be detected in a frame at least one frame before the current frame and the feature point extracted by the feature point extraction section around a reference point as a rotation angle around a third axis which is perpendicular to the detection surface, and output the control information corresponding to the rotation angle around the third axis.

According to this input device, since the rotation angle of the feature point of the image of the object to be detected around the reference point can be calculated, the control information ($\beta$) corresponding to the rotation angle around the third axis perpendicular to the detection surface can be generated while reducing the processing load. Therefore, an input device which is capable of further improving operability can be provided.

In this input device, the control information ($\Delta x$) corresponding to the movement in the first axis (X axis) direction may be output by subtracting a value obtained by weighting the rotation angle ($\gamma$) around the second axis (Y axis) with a first coefficient (a) from the first axis direction component ($\Delta X2$) of the second difference; and the control information ($\Delta y$) corresponding to the movement in the second axis (Y axis) direction may be output by subtracting a value obtained by weighting the rotation angle ($\alpha$) around the first axis (X axis) with a second coefficient (b) from the second axis direction component ($\Delta Y2$) of the second difference.

In this input device, the control information ($\Delta x$) corresponding to the movement in the first axis (X axis) direction may be output by subtracting a value obtained by weighting the rotation angle ($\gamma$) around the second axis (Y axis) with a first coefficient (a) from the first axis direction component ($\Delta X_G$ or $\Delta X_M$) of the first difference, and the control information ($\Delta y$) corresponding to the movement in the second axis (Y axis) direction may be output by subtracting a value obtained by weighting the rotation angle ($\alpha$) around the first axis (X axis) with a second coefficient (b) from the second axis direction component ($\Delta Y_G$ or $\Delta Y_M$) of the first difference.

According to this input device, since the movement of the object to be detected in the first and second axis directions is detected by adding the rotation angle around each axis to the movement of the feature point or the center of gravity of the image of the object to be detected, optimum movement in the first and second axis directions can be detected corresponding to the manner of the movement of the object to be detected (user's peculiar operation for moving the object to be detected and the like). This enables the control information in the first or second axis direction to be output with high accuracy in the case of outputting the control information around the first or second axis, whereby an input device which is capable of further improving operability can be provided.

In this input device, the object to be detected may be a fingerprint.

According to this input device, since an extremely small and lightweight fingerprint sensor can be used, an input device which is capable of further improving operability can be mounted on a portable information device.

According to still another embodiment of the present invention, there is provided an information device comprising any of the above input devices; and a processing section which performs control processing based on the control information from the input device.

According to this information device, an information device which is capable of further improving operability can be provided.

According to yet another embodiment of the present invention, there is provided a control information generation method of generating control information by using a captured image of an object to be detected, the control information generation method comprising:

extracting a feature point of an image of the object to be detected;

calculating a difference between a reference position and a position of the feature point; and outputting the control information corresponding to the difference.

According to further embodiment of the present invention, there is provided a control information generation method of generating control information by using a captured image of an object to be detected, the control information generation method comprising:

calculating an area of the image of the object to be detected which is in contact with a detection surface;

calculating a difference between the calculated area and an area of an image of the object to be detected in a frame at least one frame before the current frame; and outputting the control information corresponding to the difference in response to the movement of the object to be detected in a direction perpendicular to the detection surface.

According to still further embodiment of the present invention, there is provided a control information generation method of generating control information by using a captured image of an object to be detected, the control information generation method comprising:

calculating a center of gravity of the image of the object to be detected which is in contact with a detection surface and extracting a feature point of the image;

calculating a difference between the center of gravity and a center of gravity of an image of the object to be detected in a frame at least one frame before the current frame and calculating a difference between a position of the feature point and a position of a feature point of an image of the object to be detected in the frame at least one frame before the current frame;

detecting a rotation angle around one of a first axis and second axis which are perpendicular to each other on the detection surface, based on the difference in the center of gravity and the difference in the feature point; and outputting the control information corresponding to the rotation angle.

This control information generation method may comprise calculating a rotation angle around a third axis which is perpendicular to the first axis and the second axis on the detection surface by using a rotation angle between a feature point of an image of the object to be detected in a frame at least one frame before the current frame and the extracted feature point around a reference point.

This control information generation method may comprise outputting the control information corresponding to the movement in the first axis direction or the second axis direction by using the difference in the feature point and the rotation angle around the first axis or the second axis.

What is claimed is:

1. An input device which generates control information by moving an object to be detected, comprising:
    an image capture section which captures an image of the object to be detected;
    a feature point extraction section which extracts feature points of the image captured by the image capture section;
    a difference calculation section which calculates a difference between a distribution of positions of the feature points extracted from an image of the object to be detected in a frame at least one frame before a current frame and a distribution of positions of the feature points extracted from an image of the object to be detected in the current frame; and
    a control information output section which outputs the control information corresponding to the calculated difference,
    wherein the image capture section includes a detection surface and captures an image of an object to be detected which is in contact with the detection surface; and
    the control information output section detects an amount of movement of the object to be detected on the detection surface to obtain the control information.

2. The input device as defined in claim 1,
    wherein the control information output section detects a rotation angle of the object to be detected around an axis which is perpendicular to the detection surface.

3. The input device as defined in claim 1, wherein the object to be detected is a fingerprint.

4. An information device comprising:
    the input device as defined in claim 1; and
    a processing section which performs control processing based on the control information from the input device.

5. An input device which generates control information by moving an object to be detected, comprising:
    an image capture section which captures an image of the object to be detected;
    an area calculation section which calculates an area of the image captured by the image capture section;
    a difference calculation section which calculates a difference between an area of the image of the object to be detected in a frame at least one frame before the current frame and the area calculated by the area calculation section; and
    a control information output section which outputs the control information corresponding to the calculated difference,
    wherein the image capture section includes a detection surface and captures an image of an object to be detected which is in contact with the detection surface; and
    the control information is information corresponding to an amount of movement of the object to be detected in an axis direction perpendicular to the detection surface.

6. The input device as defined in claim 5, wherein the object to be detected is a fingerprint.

7. An information device comprising:
    the input device as defined in claim 5; and
    a processing section which performs control processing based on the control information from the input device.

8. A control information generation method of generating control information by using a captured image of an object to be detected, the control information generation method comprising:
    extracting feature points of an image of the object to be detected which is in contact with a detection surface;
    calculating a difference between a distribution of positions of feature points extracted from an image of the object to be detected in a frame at least one frame before a current frame and a distribution of positions of the feature points extracted from an image of the object to be detected in the current frame; and
    outputting the control information corresponding to the difference by detecting an amount of movement of the object to be detected on the detection surface from the difference.

9. A control information generation method of generating control information by using a captured image of an object to be detected, the control information generation method comprising:
    calculating an area of the image of the object to be detected which is in contact with a detection surface;
    calculating a difference between the calculated area and an area of an image of the object to be detected in a frame at least one frame before the current frame; and
    outputting the control information corresponding to the difference, the control information is information corresponding to an amount of movement of the object to be detected in an axis direction perpendicular to the detection surface.

* * * * *